US010467770B2

(12) United States Patent
Sato et al.

(10) Patent No.: US 10,467,770 B2
(45) Date of Patent: Nov. 5, 2019

(54) COMPUTER PROGRAM FOR CALIBRATION OF A HEAD-MOUNTED DISPLAY DEVICE AND HEAD-MOUNTED DISPLAY DEVICE USING THE COMPUTER PROGRAM FOR CALIBRATION OF A HEAD-MOUNTED DISPLAY DEVICE

(71) Applicant: SEIKO EPSON CORPORATION, Tokyo (JP)

(72) Inventors: Shinya Sato, Matsumoto (JP); Hiu Lok Szeto, Richmond Hill (CA); Kiever Xiang Chen, Toronto (CA)

(73) Assignee: SEIKO EPSON CORPORATION, Tokyo (JP)

( * ) Notice: Subject to any disclaimer, the term of this patent is extended or adjusted under 35 U.S.C. 154(b) by 31 days.

(21) Appl. No.: 15/804,211

(22) Filed: Nov. 6, 2017

(65) Prior Publication Data

US 2018/0130227 A1   May 10, 2018

(30) Foreign Application Priority Data

Nov. 9, 2016   (JP) .................................. 2016-218971

(51) Int. Cl.
*G06T 7/70* (2017.01)
*G02B 27/01* (2006.01)
(Continued)

(52) U.S. Cl.
CPC ............ *G06T 7/70* (2017.01); *G02B 27/0172* (2013.01); *G02B 27/0176* (2013.01); *G06T 7/74* (2017.01);
(Continued)

(58) Field of Classification Search
None
See application file for complete search history.

(56) References Cited

U.S. PATENT DOCUMENTS

2014/0333665 A1   11/2014   Sylvan et al.
2016/0080732 A1   3/2016   Pedley et al.

FOREIGN PATENT DOCUMENTS

JP   2005-038321 A   2/2005

OTHER PUBLICATIONS

Kato et al.; "Marker tracking and HMD calibration for a video-based augmented reality conferencing system;" Augmented Reality; pp. 85-94; Jan. 1, 1999; 1999 (IWAR '99) Proceedings, 2nd IEEE and ACM International Workshop.

(Continued)

*Primary Examiner* — Jeffrey J Chow
(74) *Attorney, Agent, or Firm* — Oliff PLC

(57) ABSTRACT

A computer program causes a head-mounted display device including an camera and an image display section capable of being transparent at least against light from a scene to realize functions of: an image setting function of displaying, with the image display section, a marker image that is capable of being perceived to be at least partially aligned with a real marker; a detection function of detecting the real marker from an image captured with the camera; a parameter setting function of setting at least one parameter for allowing an AR object displayed with the display section to be perceived to correspond to an object in the scene; a determination function of determining whether a user's head is in a substantially static condition, and a collecting function of collecting, from the image or another image captured with the camera, calibration data that is to be used in the parameter setting function in response to an instruction, in the case where the user's head is determined to be in the substantially static condition by the determination function.

9 Claims, 19 Drawing Sheets

(51) Int. Cl.
*G06T 19/00* (2011.01)
*G06T 7/80* (2017.01)
*G06T 7/73* (2017.01)

(52) U.S. Cl.
CPC .............. *G06T 7/80* (2017.01); *G06T 19/006* (2013.01); *G02B 2027/014* (2013.01); *G02B 2027/0138* (2013.01); *G02B 2027/0154* (2013.01); *G06T 2207/30204* (2013.01); *G06T 2207/30244* (2013.01)

(56) References Cited

OTHER PUBLICATIONS

Jan. 24, 2018 Search Report issued in European Patent Application No. 17200634.8.

COMPUTER PROGRAM FOR CALIBRATION OF A HEAD-MOUNTED DISPLAY DEVICE AND HEAD-MOUNTED DISPLAY DEVICE USING THE COMPUTER PROGRAM FOR CALIBRATION OF A HEAD-MOUNTED DISPLAY DEVICE

BACKGROUND

1. Technical Field

The present invention relates to a technique of a head-mounted display device.

2. Related Art

Hitherto, there has been known a head-mounted display device (HMD) which is worn on a user's head. For example, JP-A-2005-38321 discloses a video see-through type HMD in which an imaging section capable of imaging a scene through a supporting section slides up and down with respect to the HMD.

SUMMARY

When an image display apparatus including an optical see-through type head-mounted display device includes a technique of displaying an image on an object so as to be superimposed thereon with a high level of accuracy, it is possible to provide improved convenience with respect to an augmented reality (AR) function. However, when a display image is correctly superimposed on the object, it is desired that a spatial relationship between the camera and the image display section is correctly obtained.

An advantage of some aspects of this disclosure is to solve the problems described above, and this disclosure can be implemented as the following forms.

An aspect of the invention is directed to a method for a head-mounted display device comprising a camera and an optical see through display, including: displaying, with the image display, a marker image that is capable of being perceived to be at least partially aligned with a real marker; detecting the real marker from an image captured with the imaging section; setting at least one parameter for allowing an AR object displayed with the display section to be perceived to correspond to an object in the scene; determining whether a user's head is in a substantially static condition, and collecting, from the image or another image captured with the camera, calibration data that is to be used in setting at least the parameter, in response to an instruction, in the case where the user's head is determined to be in the substantially static condition. According to this aspect, the calibration data is collected in a case where it is determined that the user's head is in the static condition after the user gives the collecting instruction, and thus it is possible to start collecting the calibration data after it is estimated that alignment is made by the user's visual observation. For this reason, it is possible to expect to improve the accuracy of calibration.

In the aspect described above, detecting the real marker includes deriving a temporal position and pose of the real marker based at least on the image, and collecting the calibration data includes accepting the instruction in the case where a difference between the temporal position and pose and a predetermined position and pose is below a threshold.

According to this aspect, it is possible to avoid the collection of the calibration data in a case where the temporal alignment state is not set.

In the aspect described above, displaying the marker image includes displaying a specific image with the image display in the case where the difference is below the threshold. According to this aspect, the user can confirm that the temporal alignment state is set and can input the collecting instruction.

In the aspect described above, determining whether a user's head is in a substantially static condition is determining whether the user's head is in the substantially stable condition in the case where the user's head is determined to be out of the substantially stable condition after the instruction is accepted, and collecting the calibration data includes a collecting the calibration data in the case where the user's head is determined to be in the substantially static condition. According to this aspect, even when the user's head is moved at least once, it is possible to collect the calibration data.

In the aspect described above, collecting the calibration data is collecting the calibration data, from at least one image captured with the camera, corresponding to a predetermined period of time subsequent to a time point when the user's head is determined to be out of the substantially static condition. According to this aspect, even when the user cannot maintain the static condition, it is possible to collect the calibration data.

In the aspect described above, collecting the calibration data is collecting the calibration data from an image captured with the camera in the case where the user's head is first determined to be out of the substantially static condition then to be in the substantially static condition after the instruction is accepted. According to this aspect, even when the temporal alignment state is not once set after the collecting instruction is given, the collecting instruction may not be input again when the temporal alignment state is set.

In the aspect described above, collecting the calibration data includes accepting a predetermined instruction in the case where the user's head is determined to be out of the substantially stable condition after the instruction is accepted, and collecting the calibration data further includes accepting another instruction for collecting the calibration data in the case where the user's head is determined to be in the substantially static condition after the predetermined instruction is accepted. According to this aspect, in a case where the temporal alignment state is not set after the collecting instruction is given, the user can perform again from a stage before the collecting instruction is input.

This disclosure can be implemented as various aspects other than the above-mentioned aspects. For example, this disclosure can be implemented as an aspect of a head-mounted display device that includes a camera, an optical see through display, and one or more processors configured to perform the method described above, or a non-transitory computer readable medium that embodies instructions that cause one or more processors to perform the method described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
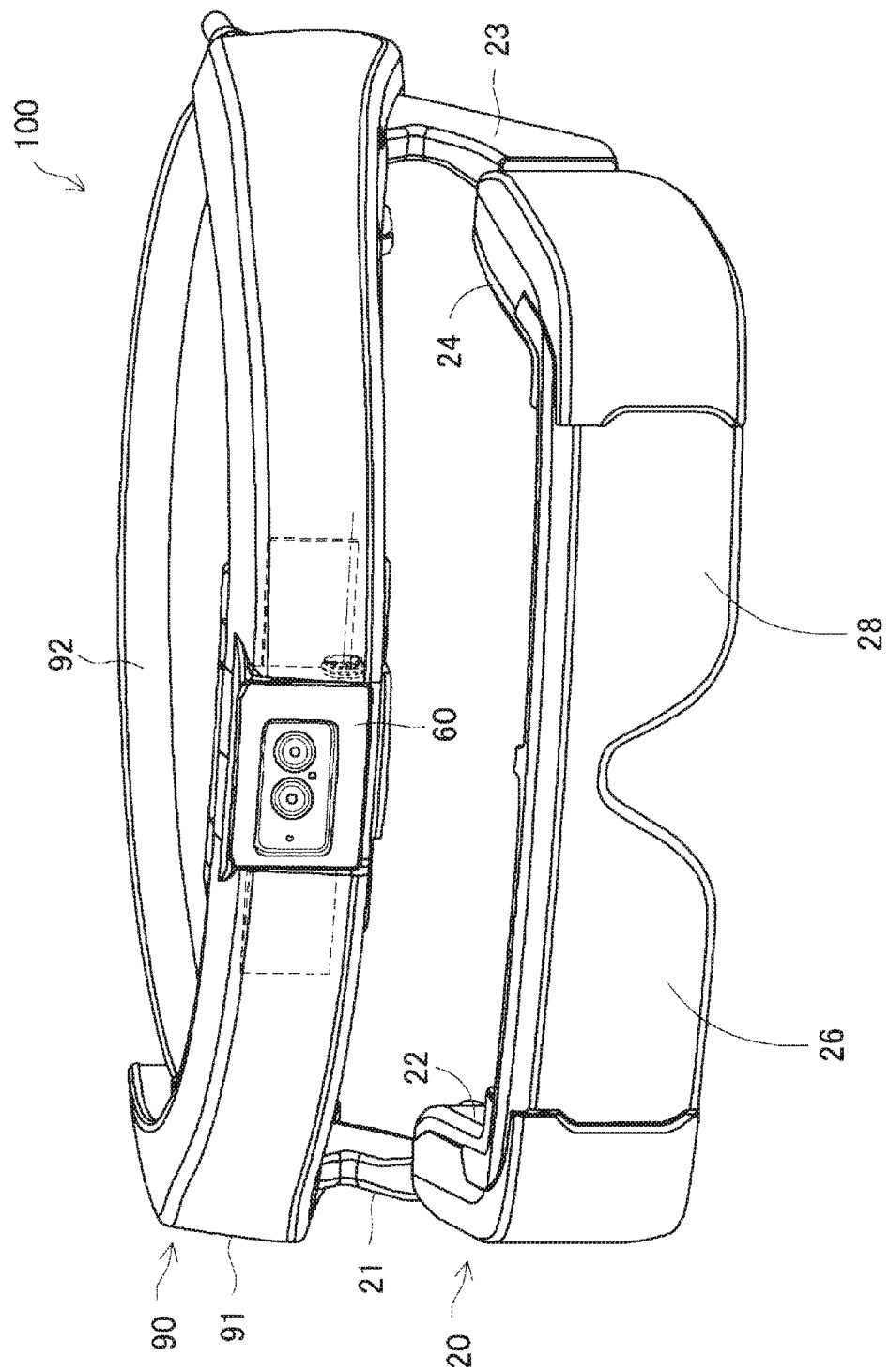
FIG. 1 is a diagram illustrating an exterior configuration of a head-mounted display device that performs calibration.
Figure 2:
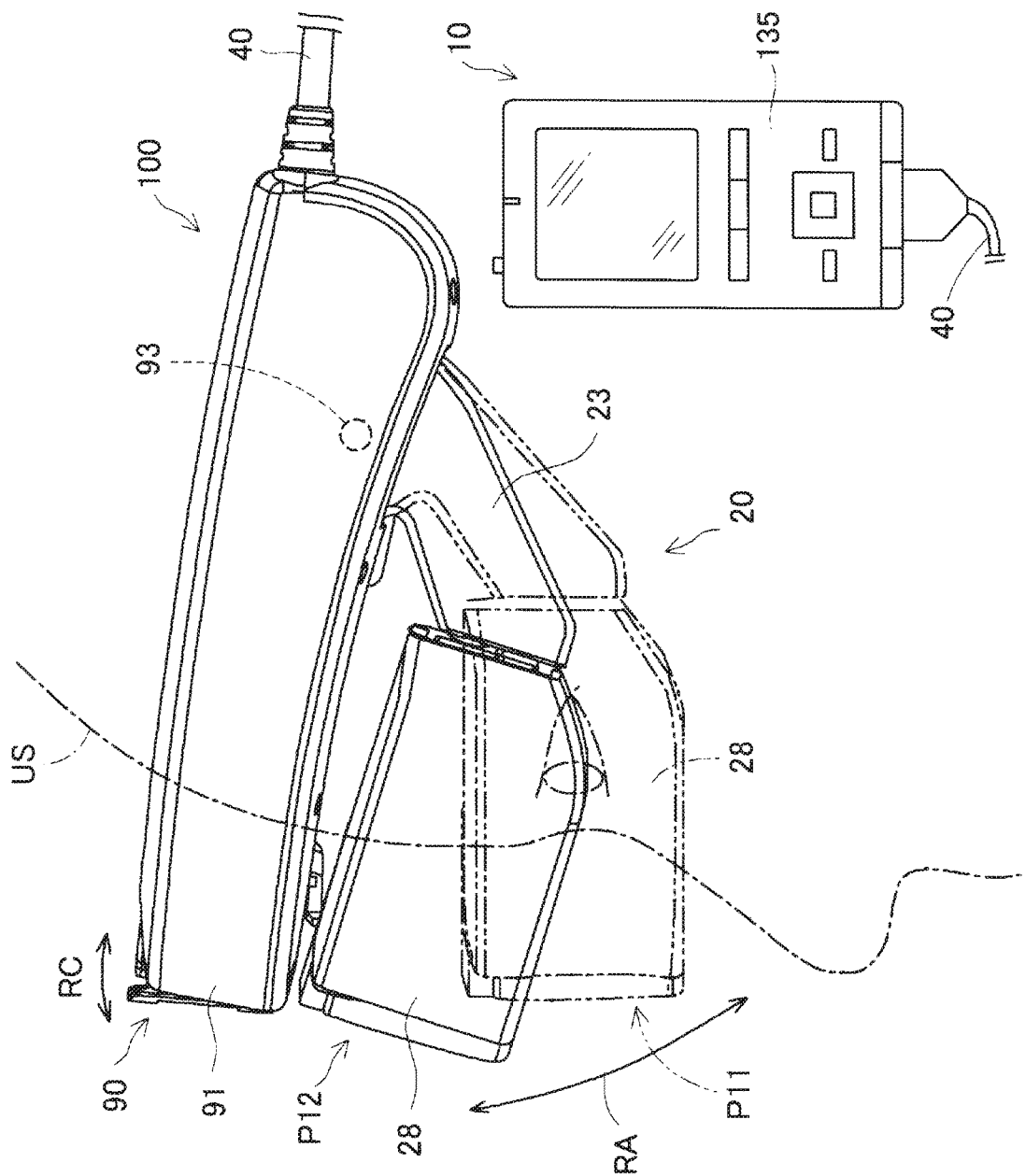
FIG. 2 is a diagram illustrating an exterior configuration of the head-mounted display device that performs calibration.
Figure 3:
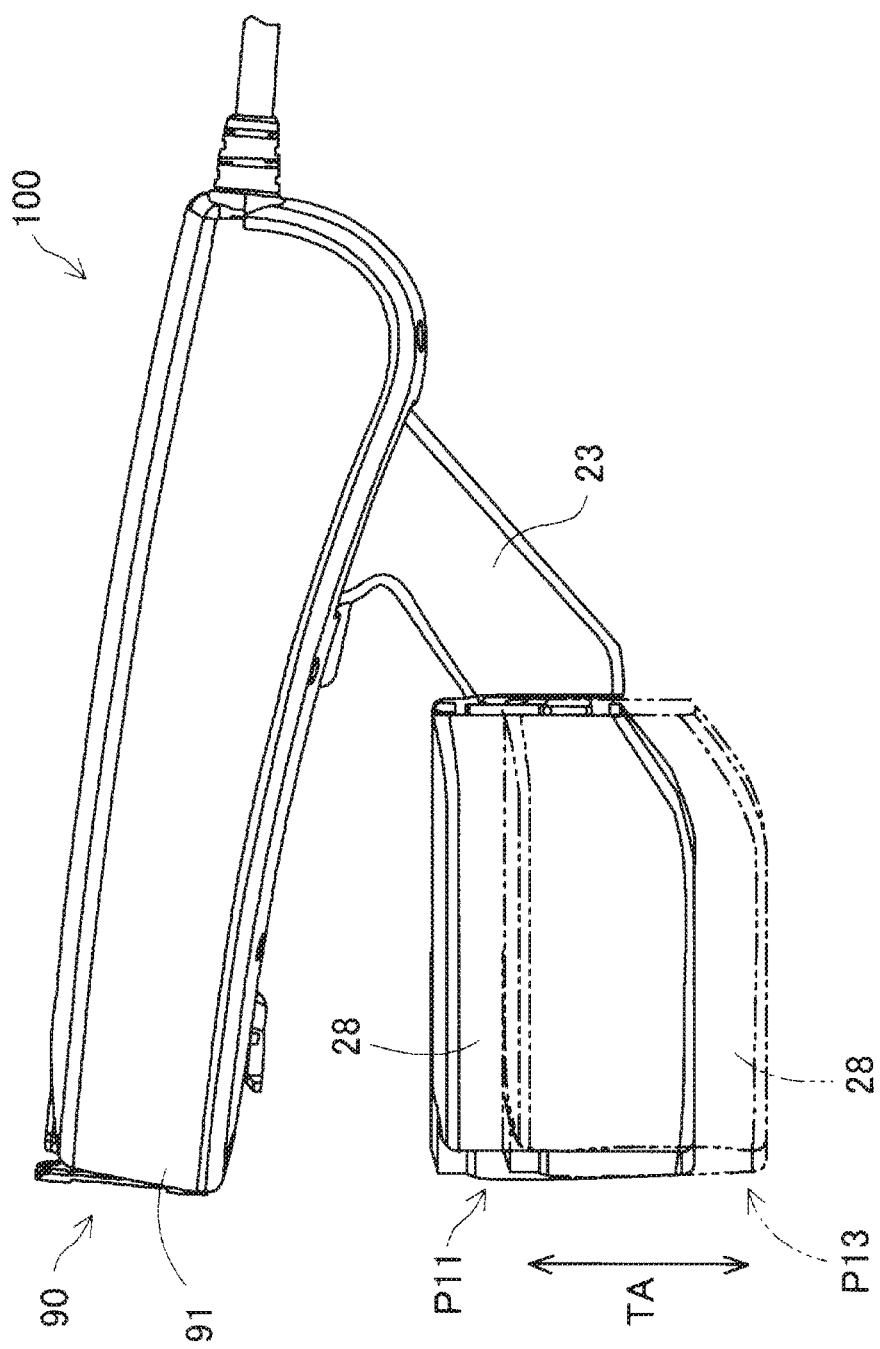
FIG. 3 is a diagram illustrating an exterior configuration of the head-mounted display device that performs calibration.

A-1. Configuration of Head-Mounted Display Device:

FIGS. 1 to 3 are diagrams illustrating an exterior configuration of a head-mounted display device 100 (HMD 100) that performs calibration. The HMD 100 can make a user US (FIG. 2) visually perceive a display image displayed on an image display section 20 and can make the user US visually perceive a scene by light from the scene passing through the image display section 20 (FIG. 1). Although a detailed configuration thereof will be described later, the HMD 100 according to the present embodiment includes image display sections corresponding to the right and left eyes of the user US wearing the image display section 20 to thereby allow the right and left eyes of the user US to visually perceive separate images.

As illustrated in FIG. 2, the HMD 100 includes a mounting band 90 mounted on the head-mounted display device of the user US, the image display section 20 connected to the mounting band 90, a control section 10 (controller 10) controlling the image display section 20, and a connection portion 40 connecting the control section 10 and the mounting band 90 to each other. As illustrated in FIG. 1, the mounting band 90 includes a mounting base portion 91 made of a resin, a belt portion 92 made of cloth and connected to the mounting base portion 91, and a camera 60. The mounting base portion 91 has a shape curved in accordance with the shape of a human's sinciput. The belt portion 92 is a belt to be mounted to the vicinity of the head of the user US. Meanwhile, the connection portion 40 connects the mounting band 90 and the control section 10 side to each other in a wired manner, but the connected portion therebetween is not illustrated in FIG. 2.

The camera 60 is capable of imaging a scene, and is disposed at the central portion of the mounting base portion 91. In other words, the camera 60 is disposed at a position corresponding to the center of the forehead of the user US with the mounting band 90 mounted on the head of the user US. For this reason, the camera 60 images a scene which is scenery on the outside in a direction of an eye gaze direction of the user US in a state where the user US wears the mounting band 90 on his or her head, and acquires the captured image. As illustrated in FIG. 2, the camera 60 is movable with respect to the mounting base portion 91 in a predetermined range along an arc RC. In other words, the camera 60 can change an imaging range in a predetermined range.

As illustrated in FIG. 2, the image display section 20 is connected to the mounting base portion 91 through a coupling portion 93 and has a shape of a pair of spectacles. The coupling portions 93 are respectively disposed on both sides of the mounting base portion 91 and the image display section 20 so as to be symmetrical to each other, and the position of the image display section 20 with respect to the mounting base portion 91 is movably supported along an arc RA centering on the coupling portion 93. In FIG. 2, a position P11 indicated by a two-dot chain line is the lowermost position of the image display section 20 along the arc RA. In addition, a position P12 indicated by a solid line in FIG. 2 is the uppermost position of the image display section 20 along the arc RA.

In addition, as illustrated in FIGS. 1 and 3, optical image display sections 26 and 28 including a display panel capable of displaying an image move in parallel with holding sections 21 and 23 along a straight line TA in a predetermined range to thereby change their positions. In FIG. 3, a position P13 indicated by a two-dot chain line is the lowermost position of the optical image display sections 26 and 28 along the straight line TA. In FIG. 3, a position P11 indicated by a solid line is the uppermost position of the optical image display sections 26 and 28 along the straight line TA. Meanwhile, the position P11 in FIG. 2 and the position P11 in FIG. 3 indicate the same position.

As illustrated in FIG. 1, the image display section 20 includes the right holding section 21, a right display driving section 22, the left holding section 23, a left display driving section 24, the right optical image display section 26, and the left optical image display section 28. The right optical image display section 26 and the left optical image display section 28 are disposed so as to be positioned in front of the right and left eyes of the user US, respectively, when the user US wears the image display section 20. An end of the right optical image display section 26 and an end of the left optical image display section 28 are connected to each other at a position corresponding to a *glabella* of the user US when the user US wears the image display section 20.

The right holding section 21 is a member which is provided so as to extend to the coupling portion 93 connected to the mounting base portion 91 from the other end of the right optical image display section 26. Similarly, the left holding section 23 is a member which is provided so as to extend to the coupling portion 93 from the other end of the left optical image display section 28. The right display driving section 22 and the left display driving section 24 are disposed on sides corresponding to the head of the user US when the user US wears the image display section 20.

The display driving sections 22 and 24 include liquid crystal displays 241 and 242 (hereinafter, also referred to as "LCDs 241 and 242") to be described later in FIG. 2, projection optical systems 251 and 252, and the like. Configurations of the display driving sections 22 and 24 will be described in detail later. The optical image display sections 26 and 28 include light guiding plates 261 and 262 (see FIG. 4) and a light control plate which will be described later. The light guiding plates 261 and 262 are formed of a light transmissive resin material or the like, and guide image light which is output from the display driving sections 22 and 24 to the eyes of the user US. The light control plate is an optical element having a thin plate shape, and is disposed so as to cover the front side of the image display section 20 which is opposite to the side of the eyes of the user US. The light transmittance of the light control plate is adjusted, and thus it is possible to adjust the easiness of visual recognition of an imaginary image by adjusting the amount of external light entering the eyes of the user US.

The control section 10 is an apparatus for controlling the HMD 100. The control section 10 includes an operation input section 135 including an electrostatic track pad, a plurality of buttons capable of being pressed, or the like.

Figure 4:
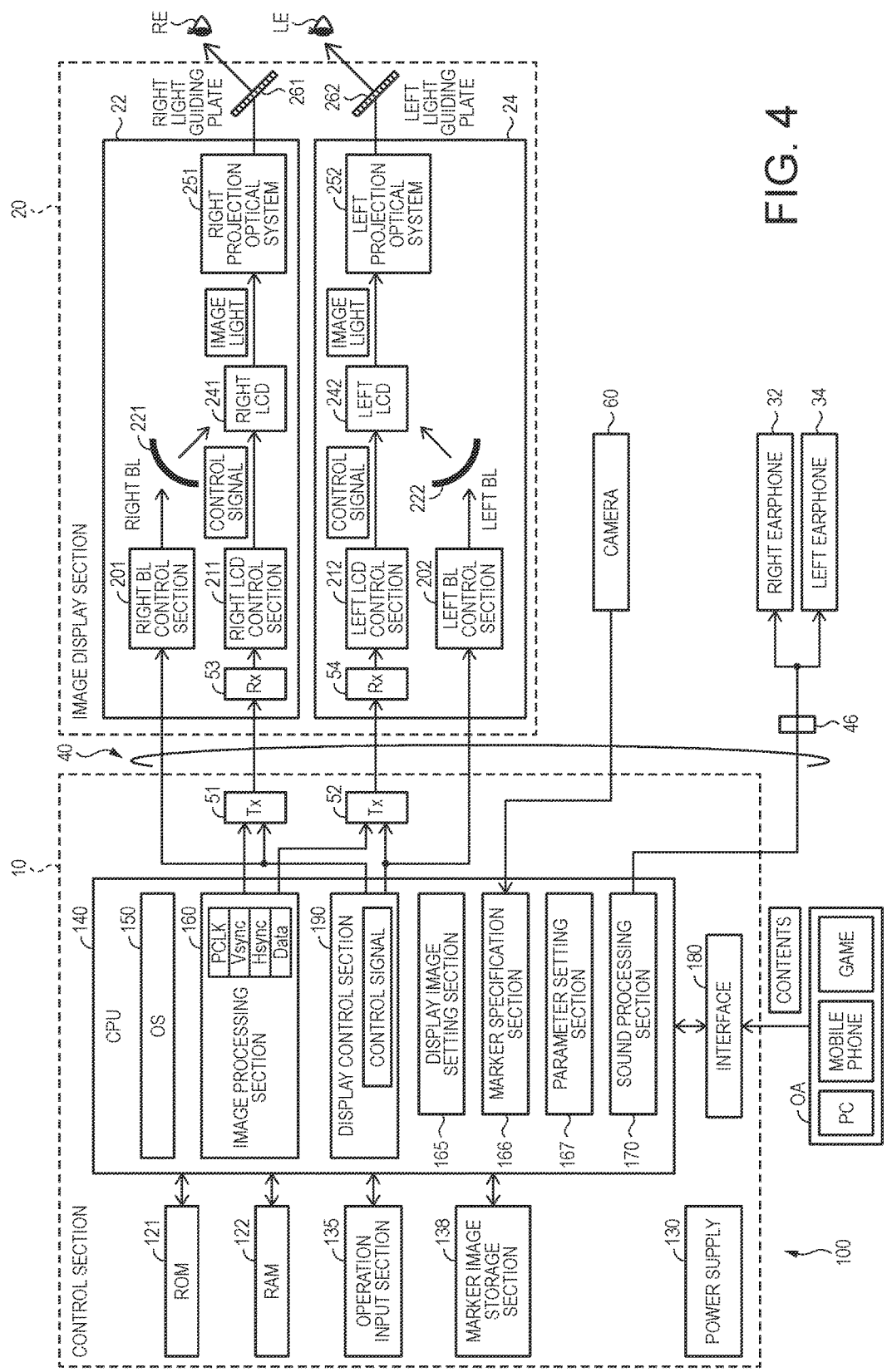
FIG. 4 is a functional block diagram illustrating a configuration of an HMD.

FIG. 4 is a functional block diagram illustrating a configuration of the HMD 100. As illustrated in FIG. 4, the control section 10 includes a ROM 121, a RAM 122, a power supply 130, the operation input section 135, a marker image storage section 138, a CPU 140, an interface 180, a transmission section (Tx51), and a transmission section 52 (Tx52).

The power supply 130 supplies power to each section of the HMD 100. The ROM 121 stores various computer programs. The CPU 140 to be described later expands various types of computer programs stored in the ROM 121 to the RAM 122 to thereby execute the various types of computer programs.

The marker image storage section 138 stores data of a model marker (also referred to as a marker model) which is used for calibration and/or a marker image IMG as an image for calibration which is displayed on the right optical image display section 26 or the left optical image display section 28. The marker image storage section 138 may store a marker image displayed on the right optical image display section 26 and a marker image displayed on the left optical image display section 28 as the same marker image IMG. Examples of the marker image IMG to be used include an image of a two-dimensional model marker, data of the above-mentioned model marker (2D) expressed in a three-dimensional model space (3D computer graphic space), or the model marker which is mapped on the basis of a mapping parameter of each of the right optical image display section 26 or the left optical image display section 28. In other words, the marker image IMG is an image obtained by two-dimensionally expressing the shape of a two-dimensional or three-dimensional real marker MK1 which is present as a real object.

Figure 5:
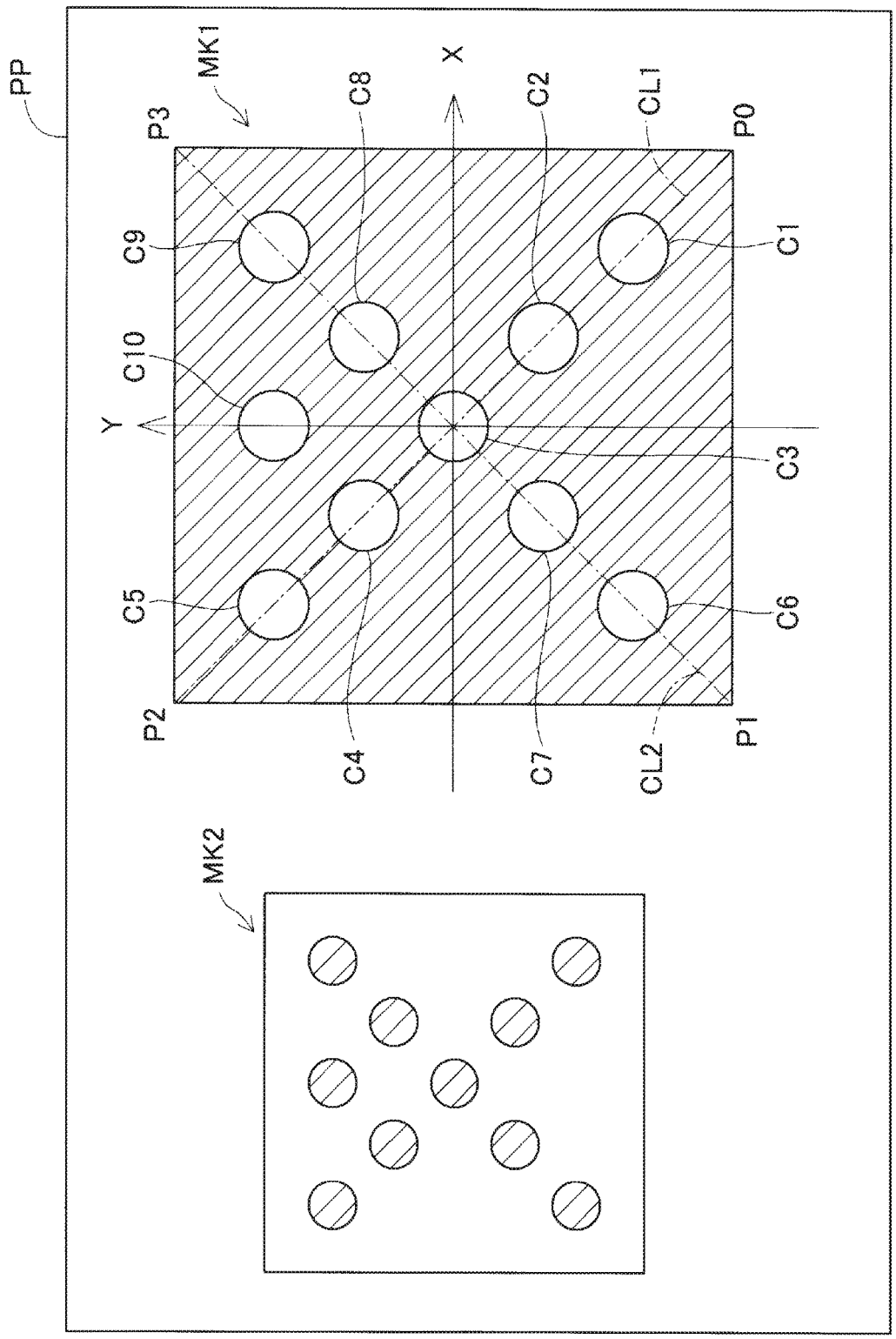
FIG. 5 is a diagram illustrating two-dimensional real markers printed on paper.

FIGS. 5 to 8 are diagrams illustrating two-dimensional real markers printed on paper PP. FIG. 5 illustrates real markers MK1 and MK2 as two markers that are used for calibration according to the present embodiment. As illustrated in FIG. 5, the real marker MK1 is a marker including ten circles in a square formed by connecting four vertexes P0, P1, P2, and P3 by a straight line. The centers of five circles among the ten circles are present on a diagonal line CL1 connecting the vertex P0 and the vertex P2. The five circles are circles C1, C2, C3, C4, and C5 from a circle close to the vertex P0 along the diagonal line CL1. Similarly, the centers of five circles among the ten circles are present on a diagonal line CL2 connecting the vertex P1 and the vertex P3. The five circles are circles C6, C7, C3, C8, and C9 from a circle close to the vertex P1 along the diagonal line CL2. The circle C3 is on an intersection between the diagonal line CL1 and the diagonal line CL2 and is a circle centering on a point which is the centroid of the square. A circle C10, which is one circle among the ten circles, has its center on the Y axis that passes through the centroid of the square and is parallel to a straight line connecting P1 and P2. The circle C10 has its center at the same position as those of the circles C5 and C9 along the X-axis that passes through the centroid of the square and is perpendicular to the Y-axis. In other words, the circle C10 is a circle having its center between the center of the circle C5 and the center of the circle C9.

In the present embodiment, distances between the centers of circles adjacent to each other in five circles having the center on the diagonal line CL1 are set to be the same as each other. Similarly, distances between the centers of circles adjacent to each other in five circles having the center on the diagonal line CL2 are set to be the same as each other. In addition, a distance between the centers of circles, having the center on the diagonal line CL1, which are adjacent to each other and a distance between the centers of circles, having the center on the diagonal line CL2 are the same distance. Meanwhile, only the circle C10 among the ten circles differs from the other circles in a distance between the center thereof and the center of each of the other circles. The sizes of the ten circles are the same as each other. Meanwhile, the diagonal line CL1, the diagonal line CL2, the X-axis, and the Y-axis are illustrated in FIG. 5 for convenience of description of the real marker MK1, and are straight lines that are not included in a real marker MK1.

In FIG. 5, a difference in color is illustrated by changing hatching. Specifically, a hatched portion in FIG. 5 is black in color, and the other portions are white in color. For this reason, as illustrated in FIG. 5, the real marker MK1 is formed of a black square, which is surrounded with a white color, on white paper PP, and white ten circles are formed in the square.

Figure 6:
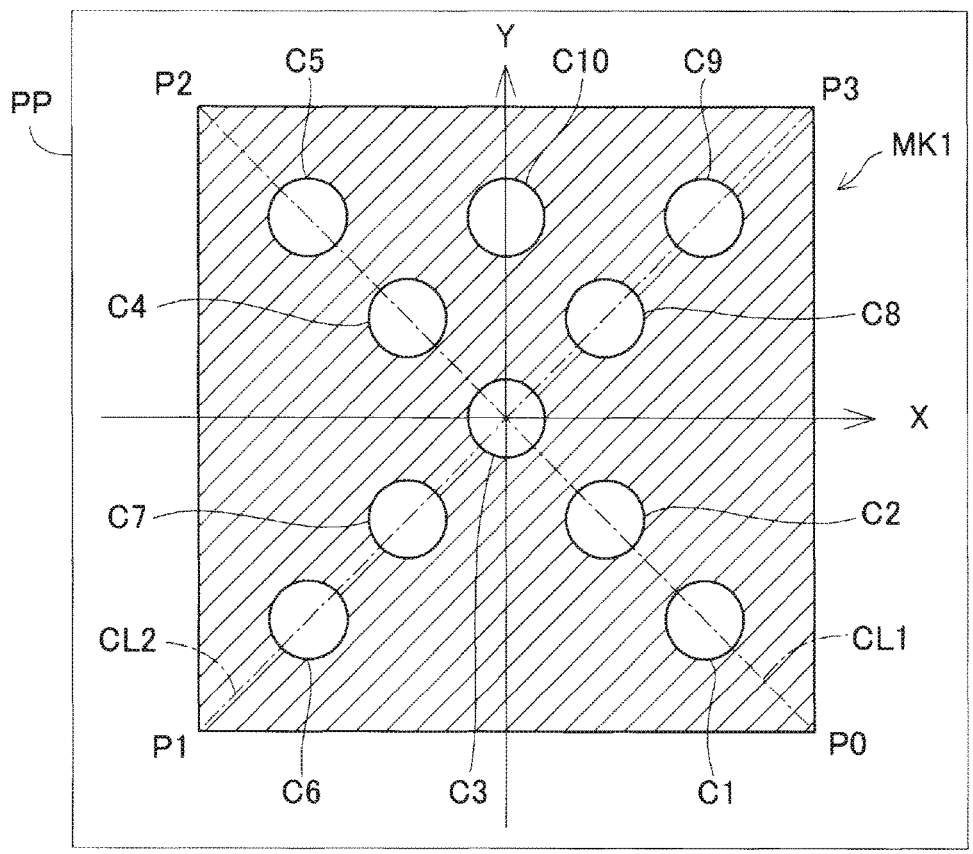
FIG. 6 is a diagram illustrating a two-dimensional real marker printed on paper.
Figure 7:
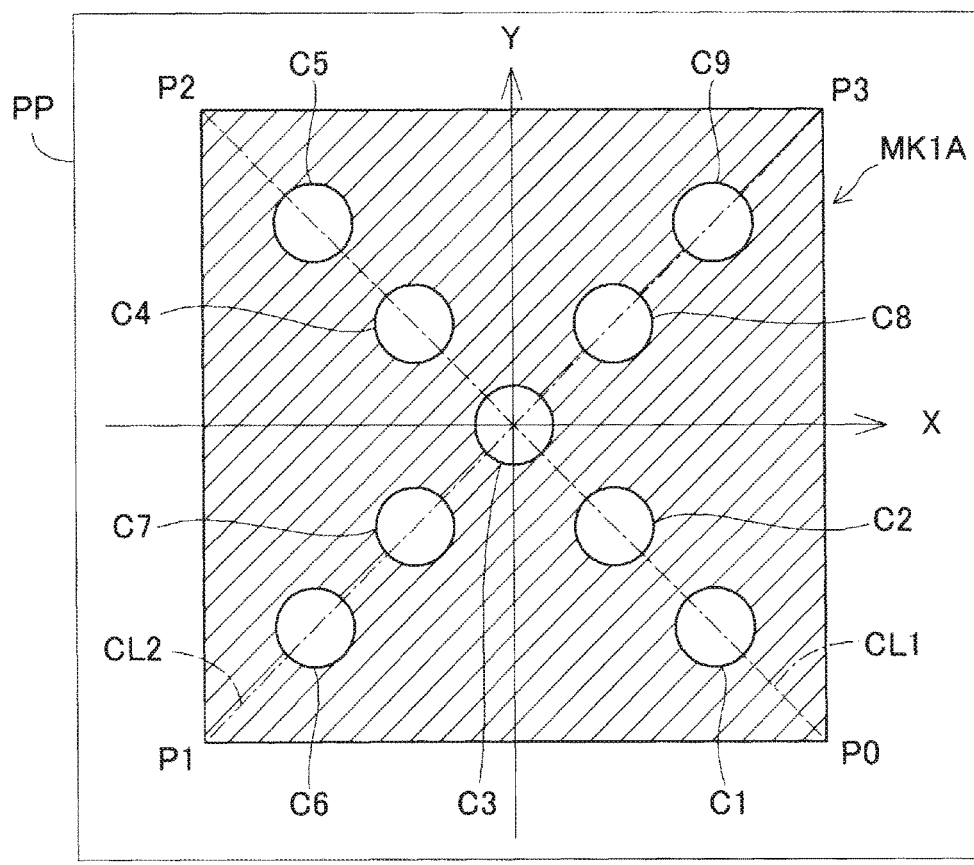
FIG. 7 is a diagram illustrating a two-dimensional real marker printed on paper.
Figure 8:
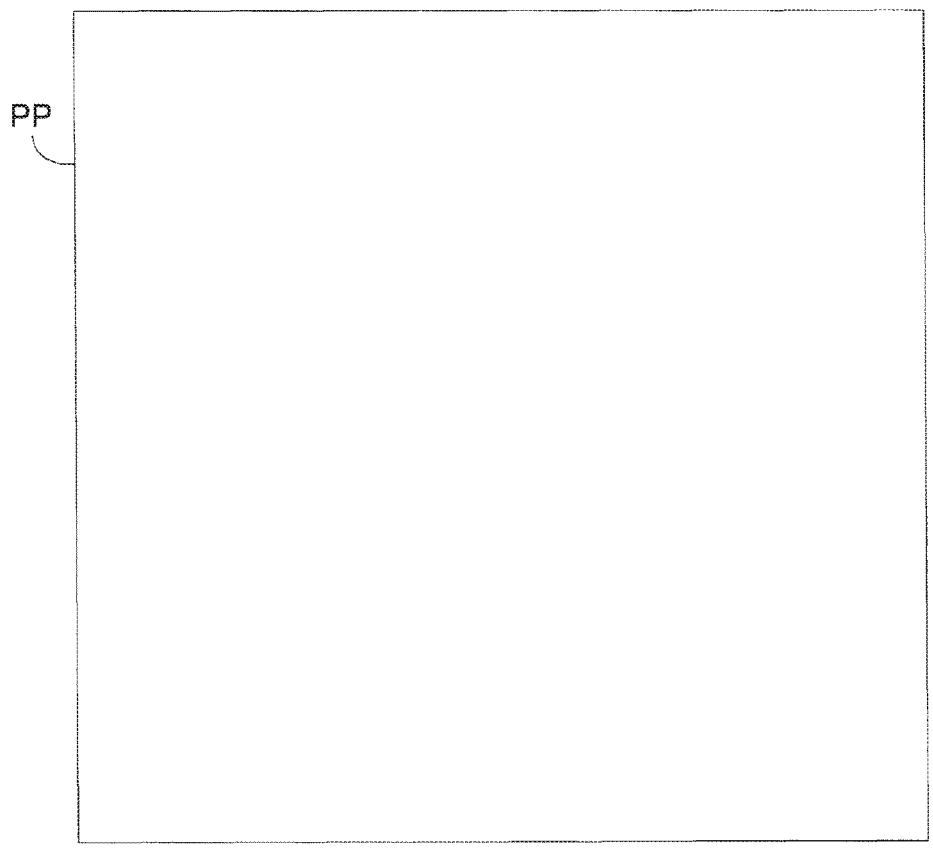
FIG. 8 is a diagram illustrating two-dimensional real markers printed on paper.

The real marker MK2 illustrated in FIG. 5 is a marker which is created on the basis of the real marker MK1. The real marker MK2 is a marker obtained by reducing the size of the real marker MK1 and reversing a black color and a white color. For this reason, as illustrated in FIG. 5, the real marker MK2 is formed by a white square surrounded by a black color (as illustrated with a black line), and black ten circles are formed in the square. In the present embodiment, the marker image storage section 138 stores a marker image IMG which is a two-dimensional image of the real marker MK1. Meanwhile, as illustrated in FIG. 6, a real marker MK2 may be separated from a real marker MK1. In addition, as illustrated in FIG. 7, a real marker MK1A that does not include a circle, which is not present on a diagonal line, may be adopted instead of a real marker MK2 (MK1). Meanwhile, as illustrated in FIG. 8, the rear faces of real markers MK1, MK2, and MK1A are not required to have features of a shape, a pattern, or a color.

The CPU 140 illustrated in FIG. 4 expands computer programs stored in the ROM 121 to the RAM 122 to thereby function as an operating system 150 (OS 150), a display control section 190, a sound processing section 170, an image processing section 160, a display image setting section 165, a marker specification section 166, and a parameter setting section 167.

The display control section 190 generates a control signal for controlling the right display driving section 22 and the left display driving section 24. The display control section 190 controls the generation and emission of image light by each of the right display driving section 22 and the left display driving section 24. The display control section 190 transmits each of control signals for a right LCD control section 211 and a left LCD control section 212 through the transmission sections 51 and 52. In addition, the display control section 190 transmits each of control signals for a right backlight control section 201 and a left backlight control section 202.

The image processing section 160 acquires an image signal included in contents, and transmits the acquired image signal to reception sections 53 and 54 of the image display section 20 through the transmission sections 51 and 52. The sound processing section 170 acquires a sound signal included in contents, amplifies the acquired sound signal, and provides the amplified signal to a speaker (not illustrated) within a right earphone 32 and a speaker (not illustrated) within a left earphone 34 which are connected to a coupling member 46.

The display image setting section 165 displays a marker image IMG based on the data stored in the marker image storage section 138 on the right optical image display section or the left optical image display section 28. When calibration is executed (during the execution of calibration), the display image setting section 165 controls a case where the marker image IMG is displayed on the right optical image display section 26 and a case where the marker image IMG is displayed on the left optical image display section 28 on the basis of an operation received by the operation input section 135. The display image setting section 165 displays marker images IMG, having different sizes when the camera 60 images the real marker MK1 and executes calibration and when the camera 60 images the real marker MK2 and executes calibration, on the right optical image display section 26 or the left optical image display section 28. In addition, the display image setting section 165 displays a character image to be described later, or the like on the optical image display sections 26 and 28 during the execution of calibration.

In a case where a captured image obtained by the camera 60 includes paper PP on which the real markers MK1 and MK2 are printed, the marker specification section 166 specifies the real markers MK1 and MK2 from the imaged paper PP. Although a specific process for specifying the real markers MK1 and MK2 will be described later, the marker specification section 166 extracts coordinate values of four vertexes and centers of ten circles of the real markers MK1 and MK2 to thereby specify the real markers MK1 and MK2 from the captured image. For example, the marker specification section 166 distinguishes between black and white portions in the real markers MK1 and MK2 by binarizing a gradation value of the color of the captured image to thereby extract coordinates of the centers of the circles.

The parameter setting section 167 sets parameter groups required to set the position of an augmented reality (AR) image, which is displayed on the optical image display sections 26 and 28 in a state of being associated with a specific object imaged by the camera 60 (hereinafter, also referred to as a "specific object"), and the like within a display region. Specifically, the parameter setting section 167 sets parameter groups for making the user US visually perceive the AR image in a state where at least one of the position, size, and orientation of the AR image displayed on the optical image display sections 26 and 28 is associated with at least one of the position, size, and orientation of the specific object. In other words, the parameter setting section 167 calculates at least one of the parameter groups for associating a three-dimensional coordinate system (3D) having the origin fixed to the camera 60 with a display region (2D) of the optical image display sections 26 and 28, by calibration. Meanwhile, hereinafter, a three-dimensional coordinate system having the origin fixed to the camera 60 is referred to as a camera coordinate system. In the present embodiment, as a coordinate system other than the camera coordinate system, a real marker coordinate system having the origin of the real marker MK1 or the real marker MK2 as a reference, an object coordinate system having a specific object imaged by the camera 60 as a reference, a display section coordinate system having the origin of the right optical image display section 26 or the origin of the left optical image display section 28 as a reference, and the like are defined.

Here, the parameter group includes a "detection system parameter set" and a "display system parameter set". The "detection system parameter set" includes a camera parameter CP regarding the camera 60. The "display system parameter set" includes a "transformation parameter" from 3D to 3D which indicates a spatial relationship between the camera 60 and the optical image display sections 26 and 28 and a "mapping parameter" from 3D to 2D for displaying any 3D model (CG model expressed by three-dimensional coordinates) as an image (that is, 2D). These parameters are expressed in a mode of a matrix or a vector as necessary. The notation of "one parameter" may indicate one matrix or one vector, or may indicate one of a plurality of elements included in one matrix or one vector. The parameter setting section 167 derives necessary parameters in a parameter group and uses the derived parameters during the display of an AR image. As a result, the HMD 100 can make the user US visually perceive the AR image through the image display section 20 in a state where at least one of the position, size, orientation, and depth perception of the AR image (AR model) is substantially aligned with those of a specific object. In addition to these, the HMD 100 may make appearances such as color or texture aligned with each other.

When calibration is executed, the display image setting section 165 displays an AR image or a setting image SIM (to be described later) on the right optical image display section 26 or the left optical image display section 28. A detailed process using the setting image SIM will be described later.

The interface 180 is an interface for connecting various external devices OA serving as content supply sources to the control section 10. Examples of the external device OA include a storage device storing an AR scenario, a personal computer (PC), a mobile phone terminal, a game terminal, and the like. Examples of the interface 180 to be used may include a USB interface, a micro USB interface, an interface for a memory card, an interface for a wireless LAN or a wireless personal area network (PAN), and the like. The storage device may include a recording medium capable of storing a computer program, which is read to the HMD 100, for causing the CPU 140 to realize the functions described in the embodiment.

As illustrated in FIG. 4, the image display section 20 includes the right display driving section 22, the left display driving section 24, the right light guiding plate 261 as the right optical image display section 26, and the left light guiding plate 262 as the left optical image display section 28. In other words, the image display section 20 has an optical element to transmit light from an outside scene and a display element to display an image, and by means of this structure, the image display section 20 constitutes an optical see through display that allows the user US to visually perceive the image displayed by the display element to be overlaid with the outside scene.

The right display driving section 22 includes the reception section 53 (Rx53), the right backlight control section 201 (right BL control section 201) and a right backlight 221 (right BL 221) which function as a light source, the right LCD control section 211 and the right LCD 241 which function as a display element, and a right projection optical system 251. The right backlight control section 201 and the right backlight 221 function as a light source. The right LCD control section 211 and the right LCD 241 function as a display element.

The reception section 53 functions as a receiver for serial transmission between the control section 10 and the image display section 20. The right backlight control section 201 drives the right backlight 221 on the basis of a control signal which is input. The right backlight 221 is a light-emitting body such as an LED or an electroluminescence (EL). The right LCD control section 211 drives the right LCD 241 on the basis of a control signal which is transmitted from the image processing section 160 and the display control section 190. The right LCD 241 is a light transmissive liquid crystal panel in which a plurality of pixels are arranged in a matrix.

The right projection optical system 251 is constituted by a collimate lens that collimates image light emitted from the right LCD 241 into a parallel luminous flux. The right light guiding plate 261 as the right optical image display section 26 guides image light emitted from the right projection optical system 251 to a right eye RE of the user US while reflecting the image light along a predetermined light path. Meanwhile, the left display driving section 24 has the same configuration as the right display driving section 22 and corresponds to a left eye LE of the user US, and thus a description thereof will be omitted here.

Figure 9:
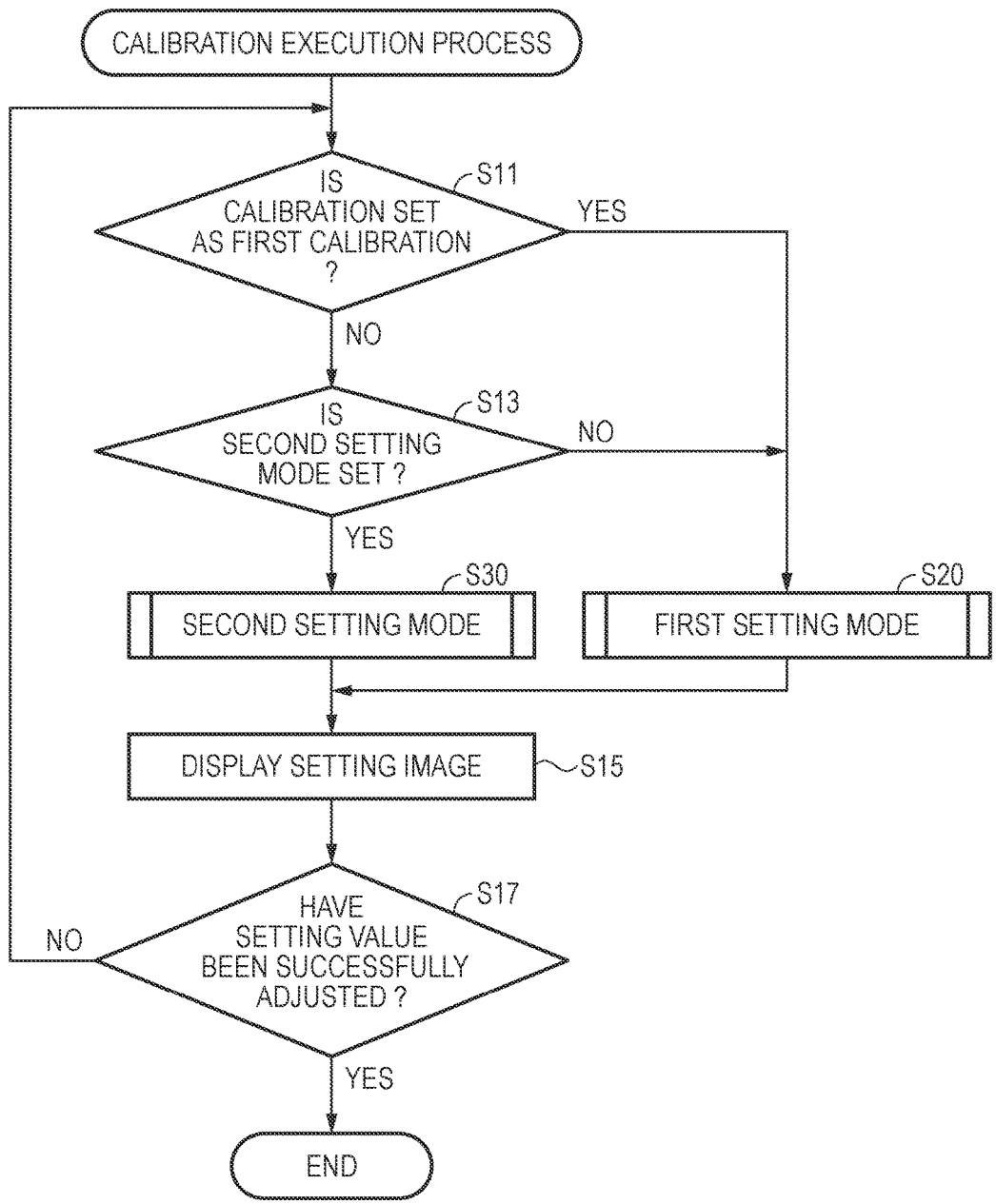
FIG. 9 is a flow chart of a calibration execution process according to the present embodiment.

A-2. Calibration Execution Process:

FIG. 9 is a flow chart of a calibration execution process according to the present embodiment. The calibration execution process according to the present embodiment includes two modes, that is, a first setting mode and a second setting mode. In the first setting mode, the HMD 100 causes the user US to perform calibration for each eye. In the second setting mode, the HMD 100 causes the user US to perform adjustment on his or her both eyes.

In the calibration execution process, when the operation input section 135 first receives a predetermined operation, the parameter setting section 167 determines whether or not calibration to be executed from now is set as first calibration (S11). The marker image storage section 138 stores data regarding whether or not calibration to be executed is first calibration. In the present embodiment, it may be determined for each user US whether or not calibration is first calibration. Specifically, the camera 60 may image the shape and pattern of the palm of the user US, and the CPU 140 may specify the user US and may determine whether or not calibration is first executed by the user US. The specification of the user US may be performed by an ID card using near field communication. In a case where it is determined that calibration is set as first calibration (S11: YES), the parameter setting section 167 proceeds to the first setting mode (S20). Although the first setting mode will be described later in detail, the parameter setting section 167 displays a marker image IMG separately on the right optical image display section 26 or the left optical image display section 28 in the first setting mode. Thereafter, the parameter setting section 167 sets a transformation parameter and a camera parameter CP using captured images of the real markers MK1 and MK2 which are imaged by the camera 60 in a state where the marker image IMG and the real markers MK1 and MK2 are visually perceived by the user US so as to be aligned with each other.

As the process of S20, when the parameter setting section 167 has executed calibration in the first setting mode, the display image setting section 165 displays a setting image SIM associated with a specific object on the optical image display sections 26 and 28 using the set transformation parameter and camera parameter CP (S15). In the present embodiment, the specific object is the real markers MK1 and MK2, but is not limited thereto. When the setting image SIM is displayed on the optical image display sections 26 and 28, the parameter setting section 167 determines whether or not the values of the transformation parameter and the camera parameter CP have been successfully adjusted in response to the operation received by the operation input section 135 (S17). Specifically, the user US determines whether or not the visual recognition of the user US is performed so that the setting image SIM is associated with the position and orientation (pose) of the specific object, and the user US may operate the operation input section 135 according to the determination. In a case where the parameter setting section 167 receives an input indicating that the set transformation parameter and camera parameter CP are sufficient (S17: YES), the parameter setting section terminates the calibration execution process.

In the process of S17, in a case where the parameter setting section 167 receives an input indicating that the set transformation parameter and camera parameter CP are not sufficient by a predetermined operation being received by the operation input section 135 or receives an input indicating that it is necessary to further adjust size and depth perception (S17: NO), the parameter setting section repeatedly performs the process of S11 and the subsequent processes. In the process of S11, in a case where the parameter setting section 167 determines that calibration to be executed from now is not set as first calibration (S11: NO), the parameter setting section determines whether to proceed to the second setting mode by a predetermined operation being received by the operation input section 135 (S13). In a case where the parameter setting section 167 determines not to proceed to the second setting mode (S13: NO), the parameter setting section proceeds to the above-described first setting mode (S20).

In the process of S13, in a case where the parameter setting section 167 determines to proceed to the second setting mode (S13: YES), the parameter setting section proceeds to the second setting mode (S30). The second setting mode will be described later in detail. However, in the second setting mode, the display image setting section 165 transforms the position and pose of the specific object with respect to the camera 60, which are obtained by imaging the specific object by the camera 60, into the positions and orientations (poses) of the specific object with respect to the right optical image display section 26 using the parameter groups which are set in the first setting mode or the second setting mode which has been executed already.

The display image setting section 165 displays the setting image SIM on the right optical image display section 26 and the left optical image display section 28 with the positions and poses obtained by the transformation. Thereafter, the parameter setting section 167 further adjusts some of the parameter groups so as to change the setting image SIM associated with the specific object in response to the predetermined operation being received by the operation input section 135. When the parameter setting section 167 executes calibration in the second setting mode, the display image setting section 165 executes the process of S15, and the subsequent processes are repeated.

A-2-1. First Setting Mode:

A process in a first setting mode is as follows. The HMD 100 causes a user US to perform two alignments each of which is performed at a time with respect to one eye, using two real markers MK1 and MK2 having different sizes, to thereby cause the user to perform a total of four alignments. Specifically, first, the HMD 100 displays a marker image IMG on the right optical image display section 26 or the left optical image display section 28. The marker image IMG is obtained by projection, that is, rendering a model marker having an imaginary position and pose (3D) to display regions (2D) of the optical image display sections 26 and 28 with respect to each of the right optical image display section 26 and the left optical image display section 28. The imaginary position and pose are fixed with respect to the optical image display sections 26 and 28 in the present embodiment, but may be variable as described later. The user US moves to a position and orientation (pose) at which the marker image IMG displayed on the right optical image display section 26 or the left optical image display section 28 and the real marker MK1 or the real marker MK2 can be visually perceived so as to be superimposed on or aligned with each other. In a case where the marker IMG and the real marker MK1 or MK2 are visually perceived by the user US so as to be superimposed on or aligned with each other, the real marker MK1 or MK2 is positioned at a predetermined distance according to the sizes of the real markers MK1 and MK2 and take the above-mentioned imaginary pose, with respect to the right optical image display section 26 or the left optical image display section 28. In a state where the marker image IMG and the real marker MK1 or the real marker MK2 are aligned with each other, the parameter setting section 167 images the real marker MK1 or the real marker MK2 using the camera 60. The parameter setting section 167 sets a transformation parameter and a camera parameter CP using the real marker MK1 or the real marker MK2 included in the captured image.

Figure 10:
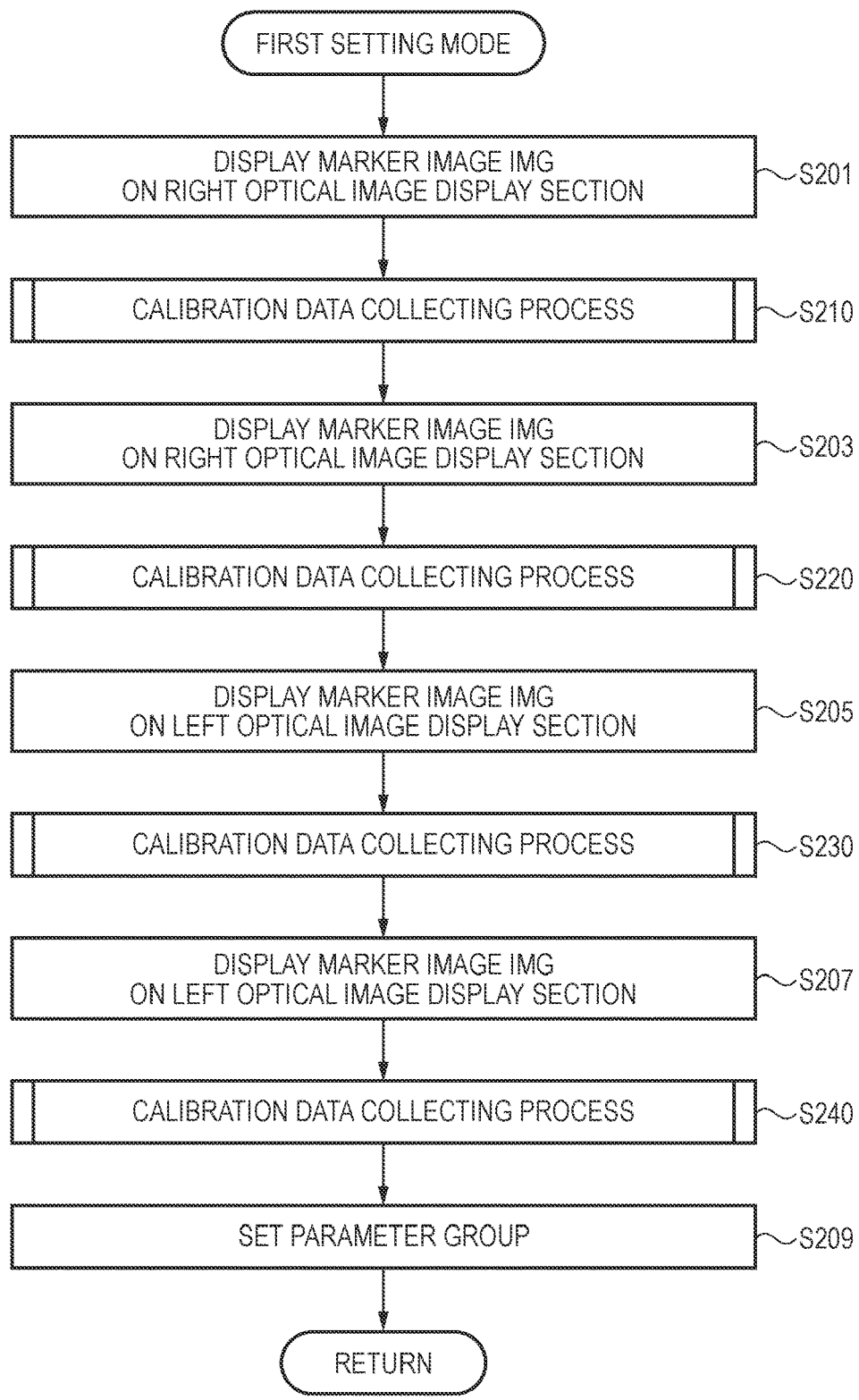
FIG. 10 is a flow chart of a first setting mode.

FIG. 10 is a flow chart of a first setting mode. In the first setting mode, the parameter setting section 167 collects calibration data in a state where alignment regarding the right optical image display section 26 is established, collects calibration data in a state where alignment regarding the left optical image display section 28 is established, and sets a transformation parameter and a camera parameter CP.

Figure 11:
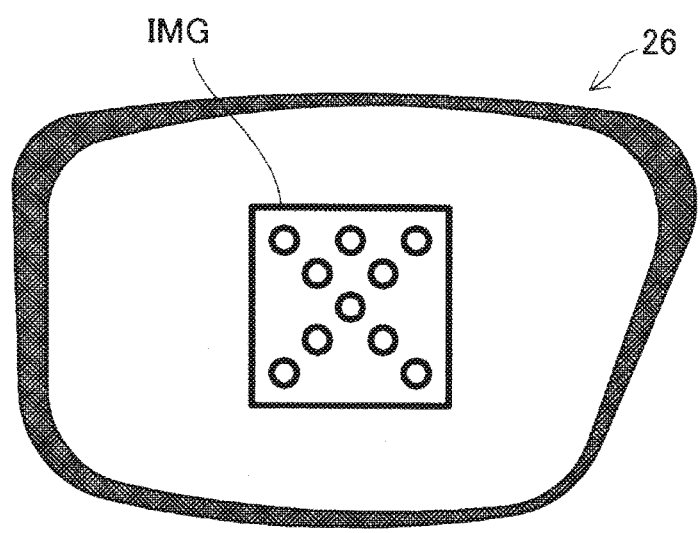
FIG. 11 is a diagram illustrating a marker image displayed on an optical image display section.

In the first setting mode, first, the display image setting section 165 displays a marker image IMG on the right optical image display section 26 (S201). FIG. 11 is a diagram illustrating the optical image display section 26 in a case where a marker image IMG displayed thereon. As illustrated in FIG. 11, the display image setting section 165 displays an outer frame of a square of a marker and outer frames of ten circles included in the square on the right optical image display section 26. The display image setting section 165 displays the marker image IMG on the right optical image display section 26 as a red line. Meanwhile, in FIG. 11, portions other than the right optical image display section 26 within the image display section 20 are not illustrated and will not be illustrated in the subsequent drawings.

When the marker image IMG is displayed on the right optical image display section 26, the parameter setting section 167 prompts the user US to match the positions and poses of the marker image IMG and a real marker MK2 with the HMD 100 worn on the user US so that the marker image and the real marker are visually perceived so as to be aligned with each other, thereby executing a calibration data collecting process (S210 of FIG. 10). The calibration data collecting process will be described later.

When the process of matching the positions and poses of the marker image IMG and the real marker MK2 (alignment process by visual observation) of S210 of FIG. 10 and the collecting of calibration data are performed, the display image setting section 165 displays the marker image IMG on the right optical image display section 26 as illustrated in FIG. 11, similar to the process of S201 (S203). Thereafter, the parameter setting section 167 prompts the user US to match the positions and poses of the marker image IMG and a real marker MK1 with the HMD 100 worn on the user so that the marker image IMG and the real marker MK1 are visually perceived so as to be aligned with each other, thereby executing a calibration data collecting process (S220). Here, the real marker MK1 is larger than the real marker MK2. For this reason, in the process of S220, in a case where the marker image IMG and the real marker MK1 are visually perceived by the user US so as to be aligned with each other, a distance between the right optical image display section 26 and the real marker MK1 becomes larger than that in a case of the real marker MK2.

The parameter setting section 167 executes the processes of S205 to S240 in FIG. 10 with respect to the left optical image display section 28, as the same processes as the processes of S201 to S220 in the right optical image display section 26. When the processes (the processes of S201 to S240) in the first setting mode are executed with respect to the right and left optical image display sections 26 and 28, the parameter setting section 167 can set a parameter group related to the right optical image display section 26 and a parameter group related to the left optical image display section 28 for minimizing Expression (15) to be described later (S209).

A-2-2. Setting of Parameters:

Here, a description will be given of a procedure of setting parameters of a transformation parameter and a camera parameter CP by the parameter setting section 167 using imaging data of the real marker MK2 and imaging data of the real marker MK1 which are obtained by the camera 60 in a first setting mode. Meanwhile, in the first setting mode of the present embodiment, the camera parameter CP does not necessarily have to be optimized, and may be fixed to a design value. However, in the present embodiment to be described below, an algorithm including a camera parameter CP as an optimization variable(s) is present so that the user US can optimize the camera parameter CP as necessary. In another embodiment, in a case where it is not necessary to optimize the camera parameter CP, the following expressions may be dealt with using these parameters as constants (fixed values).

A-2-2-1. With Regard to Camera Parameter:

As a camera parameter CP regarding the camera 60, four camera parameters CP ($f_x$, $f_y$, $C_x$, $C_y$) are used in the present embodiment. The camera parameters ($f_x$, $f_y$) are focal lengths of the camera 60 which is an imaging section, and are converted into the number of pixels on the basis of the density of pixels. The camera parameters (Cx, Cy) are called the camera principal point position, means the center position of a captured image, and may be expressed by, for example, a 2D coordinate system which is fixed to an image sensor of the camera 60.

The camera parameter CP can be known from the product specifications of the camera 60 constituting a principle portion of the imaging section (hereinafter, also referred to as a default camera parameter). However, in many cases, a camera parameter CP of a real camera greatly departs from a default camera parameter. In addition, when cameras are different products in spite of having the same specifications, camera parameters CP of cameras for each product vary (are not even).

In a case where at least one of a position, size, and pose in an AR model displayed on the optical image display sections 26 and 28 as an AR image is visually perceived by the user US so as to be aligned with (superposed on) a real object, the camera 60 functions as a detection device that detects the position and pose of the real object. At this time, the parameter setting section 167 estimates the position and pose of the real object imaged by the camera 60 with respect to the camera 60 using the camera parameter CP. Further, the parameter setting section 167 transforms the position and pose of a real object with respect to the left optical image display section 28 using a relative positional relationship between the camera 60 and the left optical image display section 28 (right optical image display section 26). Further, the parameter setting section 167 determines the position and pose of the AR model on the basis of the transformed position and pose. In addition, the image processing section 160 maps (transforms) the AR model having the position and the pose to a display region using a mapping parameter, and writes the mapped AR model in a display buffer (for example, the RAM 122). In addition, the display control section 190 displays the AR model written in the display buffer on the left optical image display section 28. For this reason, in a case where the camera parameter CP is a default camera parameter, the estimated position and pose of the real object may include errors. In this case, the displayed AR model and the real object, which are to be superposed on or overlaid with each other, are visually perceived by the user US as if there is an error in superposing the AR model on the real object due to the errors of the estimated position and pose.

Consequently, in the present embodiment, the parameter setting section 167 optimizes and sets a camera parameter CP using pieces of imaging data of the real marker MK2 and the real marker MK1 during calibration for allowing an AR model to be superposed on an object and to be visually perceived by the user US. In addition, the position and pose of the real object are detected (estimated) using the set camera parameter CP. In this manner, the degree to which a deviation generated between the displayed AR model and a real object is visually perceived by the user US becomes lower in displaying the AR model. As described later, even when the same user US uses the same HMD 100, it is preferable that a camera parameter CP is set whenever calibration is performed and is used for a subsequent display in which at least one of the position, size, and orientation of an object is aligned with that of an AR model. This does not indicate that the user US necessarily matches the positions and poses of a real marker MK2 or a real marker MK1 and a marker image IMG corresponding to the real marker MK2 or the real marker MK1 with the same level of accuracy during calibration. Even when the user US matches positions and poses with different levels of accuracy, a camera parameter CP is set accordingly, thereby suppressing an increase in a deviation of a superposition display in a case where an AR model and a real object are displayed so as to be superposed on each other.

A-2-2-2. With Regard to Transformation Parameter:

In addition, the HMD 100 of the present embodiment has a structure in which a relative positional relationship between the camera 60 and the optical image display sections 26 and 28 changes. As understood from a description of a default camera parameter, in a case where causing at least one of the position, size, and pose of an AR model to be visually perceived by the user US so as to be aligned with (superposed on) a real object, the display of the AR model based on a relative positional relationship different from a real relative positional relationship between the camera 60 and the optical image display sections 26 and 28 makes an error visually perceived in the displayed AR model and a real object that are superposed on each other.

Consequently, in the present embodiment, a transformation parameter indicating a relative positional relationship (at least one of rotation and translation) between a coordinate system of the camera 60, a coordinate system of the right optical image display section 26, and a coordinate system of the left optical image display section 28 is adjusted or set, during calibration for making an AR model visually perceived by the user US so as to be superposed on an object. When the AR model is displayed using a spatial relationship (relative positional relationship) indicated by the set transformation parameter, the degree to which a deviation is visually perceived by the user US becomes lower.

In the present embodiment, the parameter setting section 167 sets a left transformation parameter PML[Rcam2left, tcam2left] and a right transformation parameter PMR [$R_{cam2right}$, $t_{cam2right}$] that correspond to the right optical image display section 26 and the left optical image display section 28, respectively. A rotation matrix $R_{cam2right}$ is three parameters that are determined by the rotation of three axes perpendicular to each other, and a translation matrix $T_{cam2right}$ is three parameters that respectively correspond to translations along the three axes. That is, the right transformation parameter PMR corresponding to the right optical image display section includes a total of six parameters. Similarly, the transformation parameter corresponding to the left optical image display section 28 is a rotation matrix $R_{cam2left}$ and a translation matrix $T_{cam2left}$, and includes a total of six parameters. As described above, in the present embodiment, 16 parameters of four parameters included in a camera parameter CP and 12 transformation parameters indicating a spatial relationship are calculated.

A-2-2-3. Parameter Derivation Process:

In the following description, the camera 60 images a real marker MK2 (or a real marker MK1) in a state where the real marker MK2 (or the real marker MK1) and a marker image IMG are visually perceived by the user US so as to be aligned with each other, and the parameter setting section 167 acquires the captured image. The parameter setting section 167 calculates a camera parameter and a transformation parameter using Expression (15) to be described later, on the basis of the acquired captured image. In the present embodiment, a measurement value(s) or an inspection value(s) before the shipment of the HMD 100 from a manufacturing factory is used as an initial value(s) (i=0) in a case where a setting parameter is set. On the other hand, in another embodiment, a value(s) in the pose of either the camera 60 or the optical image display sections 26 and 28 in a case where the movement thereof is maximized, or a value(s) in the middle pose in the movable range may be used as an initial value(s).

Figure 12:
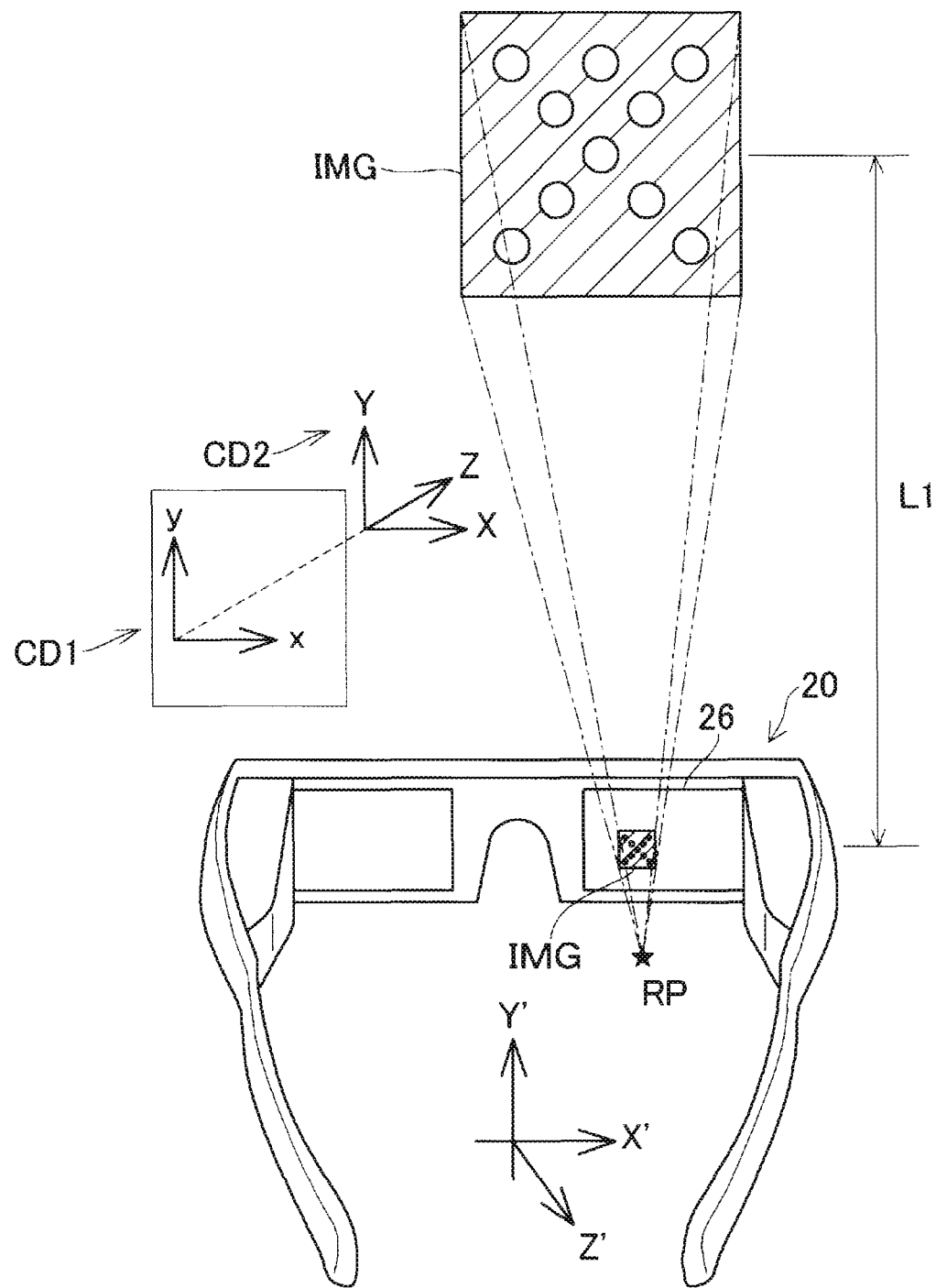
FIG. 12 is a schematic diagram illustrating a state where a marker image is displayed on only a right optical image display section.

FIG. 12 is a schematic diagram illustrating a spatial positional relationship in a state where a marker image IMG is displayed on only the right optical image display section 26. FIG. 12 schematically illustrates a case where the user US visually perceives a marker image IMG displayed on the right optical image display section 26 from a right eye position RP which is set in advance as the position of an imaginary right eye of the user US wearing the image display section 20. Meanwhile, in FIG. 12, only the image display section 20 within the HMD 100 is illustrated, and the mounting band 90, the control section 10, and the like are not illustrated. In other words, the image display section 20 illustrated in FIG. 12 is the same image display section as the image display section illustrated in FIGS. 1 to 3. In addition, FIG. 12 illustrates a coordinate axis CD2 indicating a coordinate axis of a scene which is a three-dimensional space to be imaged, and a coordinate axis CD1 indicating a coordinate axis of a two-dimensional image in which the coordinate axis CD2 is projected. The user US visually perceives the marker image IMG displayed on the right optical image display section 26 as a marker MK1 which is present at a position separated from the image display section 20 at a distance L1.

As illustrated in FIG. 12, in a case where the user US visually perceives the marker image IMG displayed on the right optical image display section 26 and a real marker MK1 which is included in a scene and is positioned at the front so that the positions, sizes, and orientations of the marker image and the real marker are aligned with each other (hereinafter, also referred to as a case where the user US establishes alignment by his or her left eye LE (right eye RE)), the following relationship of Expression (1) is established between coordinate systems. Meanwhile, hereinafter, a description will be given of a case where a marker image IMG is displayed on the left optical image display section 28 instead of being displayed on the right optical image display section 26.

$$CP \times [R_{o2dl}, t_{o2dl}] \times \text{ModelMatrix} = CP \times [R_{cam2left}, t_{cam2left}] \times [R_{obj2cam}, t_{obj2cam}] \times \text{ModelMatrix} \quad (1)$$

Here, CP on each of the right and left sides indicates a camera parameter CP of the camera 60. In addition, [Ro2dl, to2dl] indicates a transformation matrix from a coordinate system fixed to a real object (in this case, a real marker MK2 or a real marker MK1) to a coordinate system fixed to the left optical image display section 28. Among these, $[R_{o2dl}]$ indicates a 3×3 matrix indicating rotations, and $[t_{o2dl}]$ indicates a 3×1 matrix indicating translations. Here, $[R_{o2dl}, t_{o2dl}]$ indicates the position and pose of the real object with respect to the left optical image display section 28. In addition, ModelMatrix indicates a 3×1 matrix indicating any one point on a model marker. The model marker is three-dimensional data (three-dimensional model: but is a plan in the present embodiment) which is a basis in a case where a marker image IMG is displayed on the optical image display section 28. The notation of $[R_{o2dl}, t_{o2dl}]$ ×ModelMatrix goes by a rule of the following Expression (2).

$$[R_{o2dl}, t_{o2dr}] \times \text{ModelMatrix} = [R_{o2dl}] \times \text{ModelMatrix} + [t_{o2dl}] \quad (2)$$

The rule of the notation of Expression (2) mentioned above is also applied to other portions of Expression (1).

Here, $[R_{cam2left}, t_{cam2left}]$ on the right side of Expression (1) indicates a transformation matrix from the coordinate system of the camera 60 to the coordinate system of the left optical image display section 28. The transformation matrix is constituted by a plurality of transformation parameters that are set by the parameter setting section 167. In addition, $[R_{obj2cam}, t_{obj2cam}]$ on the right side of Expression (1) indicates a transformation matrix from a coordinate system of a real object (a real marker MK2 or a real marker MK1) to the coordinate system of the camera 60. In addition, $[R_{obj2cam}, t_{obj2cam}]$ indicates the position and pose of the real object with respect to the camera 60.

From the relationship of Expression (1), when alignment between a marker image IMG and the real marker MK2 or the real marker MK1 is established with respect to the left optical image display section 28, the following Expressions (3) and (4) are established.

$$R_{obj2cam} = inv(R_{cam2left}) * R_{o2dl} \quad (3)$$

$$t_{obj2cam} = inv(R_{cam2left}) * (t_{o2dl} - t_{cam2left}) \quad (4)$$

In a case where the pose of the real marker MK2 or the real marker MK1 with respect to the camera 60 is applied to a model marker when it is assumed that the alignment of the left eye LE is established, any point on the model marker transformed into the coordinate system of the camera 60 is expressed as $P_{cl}$ ($X_{cl}$, $Y_{cl}$, $Z_{cl}$) by the following Expression (5).

$$P_{cl} = \begin{bmatrix} X_{cl} \\ Y_{cl} \\ Z_{cl} \end{bmatrix} = R_{obj2cam} \times \text{ModelMatrix} + t_{obj2cam} \quad (5)$$

Here, when $R_{obj2cam}$ and $t_{obj2cam}$ are erased by Expression (3) and Expression (4), Expression (5) changes to the following Expression (6).

$$P_{cl} = \begin{bmatrix} X_{cl} \\ Y_{cl} \\ Z_{cl} \end{bmatrix} = inv(R_{cam2left})(R_{o2dl} \times \text{ModelMatrix} + t_{o2dl} - t_{cam2left}) \quad (6)$$

Here, $R_{o2dl}$ and $t_{o2dl}$ respectively indicate rotation and translation from the coordinate system of the real marker MK2 or the real marker MK1 to the coordinate system of the left optical image display section 28. In the present embodiment, the marker image IMG is fixed and displayed at a predetermined position (for example, the center) on the left optical image display section 28 with a predetermined orientation and a predetermined size. Then, when the user US aligns the marker image IMG displayed on the left optical image display section 28 with the real marker MK2 or the real marker MK1, $R_{o2dl}$ and $t_{o2dl}$ become predetermined rotation and translation which coincide whit the predetermined position, orientation and size of the marker image IMG. Here, $T_{cam2left}$ indicates translation from the coordinate system of the camera to the coordinate system of the left optical image display section 28.

$$R_{o2d_l} = \begin{bmatrix} 1 & 0 & 0 \\ 0 & 1 & 0 \\ 0 & 0 & 1 \end{bmatrix} \quad (7)$$

-continued $$t_{o2d_l} = \begin{bmatrix} 0 \\ 0 \\ -a \end{bmatrix} \quad (8)$$

$$t_{cam2left} = \begin{bmatrix} D1 \\ D2 \\ D3 \end{bmatrix} \quad (9)$$

Elements in Expressions (7) and (8) mentioned above are constants (a is L1 of FIG. 12) in the present embodiment. Elements D1, D2, and D3 in Expression (9) indicate initial values in the present embodiment, and may vary during a parameter derivation process. Meanwhile, as understood from FIG. 12, in the present embodiment, in a coordinate system fixed to the image display section 20, a direction of light emitted to the eyes of the user US from the optical image display sections 26 and 28 (image display section 20) is parallel to a Z-axis direction.

When a model marker expressed as Expression (5) is mapped onto an image captured by the camera 60, coordinates of the model marker on the captured image are as follows.

$$x_{iml} = F_x \frac{X_{cl}}{Z_{cl}} + C_x \quad (10)$$

$$y_{iml} = F_y \frac{Y_{cl}}{Z_{cl}} + C_y \quad (11)$$

Here, (Fx, Fy) indicates focal lengths of the camera 60, and (Cx, Cy) indicates principal point position coordinates of the camera 60.

When coordinates of a feature element of a marker in a captured image obtained by actually imaging the real marker MK2 or the real marker MK1 by the camera 60 are represented as $(u_1, v_1)$, a difference between $(u_1, v_1)$ and $(x_{iml}, y_{iml})$ is as follows.

$$e_i = \begin{bmatrix} e_x \\ e_y \end{bmatrix} = \begin{bmatrix} u_{li} - x_{imli} \\ v_{li} - y_{imli} \end{bmatrix}, i = 1\sim9 \quad (12)$$

A subscript i in Expression (12) is an integer indicating a feature element in a marker and has a value of 1 to 9. The parameter setting section 167 derives the sum of squares expressed as Expression (13) with respect to the alignment of the left eye LE.

$$E_L = \Sigma_{i=1}^{9}((u_{li}-x_{imli})^2 + (v_{li}-y_{imli})^2) \quad (13)$$

Also in a case where the user US establishes alignment between a marker displayed on the right optical image display section 26 and the real marker MK2 or the real marker MK1 using the right eye RE, the sum of squares expressed as Expression (14) is derived similarly.

$$E_R = \Sigma_{i=1}^{9}((u_{ri}-x_{imri})^2 + (v_{li}-y_{imri})^2) \quad (14)$$

A cost function E expressed as Expression (15) is defined by the sum of $E_R$ and $E_L$.

$$E = E_R + E_L \quad (15)$$

A parameter for minimizing (global minimum) E is obtained by optimization calculation accompanied by iterative calculation such as a Gaussian Newton's method.

In the present embodiment, the camera parameter CP of the camera 60, a transformation parameter indicating rotation ($R_{cam2left}$) and translation ($T_{cam2left}$) from the coordinate system of the camera 60 to the coordinate system of the left optical image display section 28, and a transformation parameter indicating rotation ($R_{cam2right}$) and translation ($T_{cam2right}$) from the coordinate system of the camera 60 to the coordinate system of the right optical image display section 26 are set by optimization.

A Jacobian matrix which is used for iterative calculation for minimizing the cost function E expressed as Expression (15) is expressed as Expression (16).

$$J_L = \begin{bmatrix} \frac{\partial x_{iml_i}}{\partial p} \\ \frac{\partial y_{iml_i}}{\partial p} \end{bmatrix} \quad (16)$$

Here, variables $x_{mli}$ and $y_{mli}$ on the right side of Expression (16) are expressed by Expressions (10) and (11), respectively, and $x_{cl}$ and $y_{cl}$ in Expressions (10) and (11) are expressed by Expression (6). In addition, a variable p on the right side of Expression (16) is Fx, Fy, Cx, and Cy that are included in the camera parameters CP of the camera 60, six Euler's angles constituting rotation $R_{cam2left}$ and $R_{cam2right}$ indicating a spatial relationship between the camera 60 and the optical image display sections 26 and 28, and six translation components constituting translation $T_{cam2left}$ and $T_{cam2right}$. The parameter setting section 167 can search for the global minimum of Expression (15) on the basis of the Jacobian matrix of Expression (16) and a minute variation of a variable p. A camera parameter CP and a transformation parameter are obtained by a variable p corresponding to the global minimum.

When the camera parameter CP and the transformation parameter are set, the display image setting section 165 displays a setting image SIM on the optical image display sections 26 and 28 for the purpose of causing the user US to confirm the set transformation parameter and camera parameter CP using an image, as the process of S15 in the calibration execution process illustrated in FIG. 9. In a case where a specific object (a real marker MK1 in this example) is included in an imaging range of the camera 60, the CPU 140 derives the position and pose of the specific object with respect to the camera 60 using the set camera parameter CP. In addition, the CPU 140 transforms the position and pose of the specific object with respect to the camera 60 into the position and pose of the specific object with respect to the optical image display sections 26 and 28, using the set transformation parameter. The display image setting section 165 gives the transformed position and pose to an AR model, maps the AR model, and displays the AR model on the optical image display sections 26 and 28 as a setting image SIM. In this example, when the user US can be allowed to visually perceive the position and pose of the setting image SIM to be aligned with the position and pose of the specific object and to track the movement of the specific object, the setting of the transformation parameter and the camera parameter CP is sufficient. When internal coordinates of a real marker or an AR model corresponding to the real marker are defined as X, a position (u, v) on a display image in the left optical image display section 28 is expressed as Expression (17) with a transformation parameter.

$$\begin{bmatrix} u \\ v \end{bmatrix} \simeq RP[R_{cam2left}, T_{cam2left}][R_{obj2cam}, T_{obj2cam}] \cdot X \quad (17)$$

Here, [$R_{obj2cam}$, $T_{obj2cam}$] indicates parameters (a rotation matrix and a translation matrix) which indicate a spatial relationship between a real marker MK2 or a real marker MK1 and the camera 60, and are calculated by the parameter setting section 167 by applying, for example, a nomography to a captured image of the real marker MK2 or the real marker MK1 which is imaged by the camera 60. In a case where the marker specification section 166 is to detect a specific object other than the real marker MK2 and the real marker MK1, the parameter setting section 167 sets a spatial relationship between the specific object and the camera 60 using another method. Meanwhile, also regarding the right optical image display section 26, a position (u, v) of a display image is derived by the relational expression similar to Expression (17). As expressed as Expression (17), the display image setting section 165 displays pixels of an AR model as an AR image at positions (u, v) which are determined on the basis of at least a spatial relationship between the real marker MK2 or the real marker MK1 and the camera 60 and a spatial relationship between the camera 60, and the right/left optical image display sections 26/28. The display image setting section 165 can make the user US visually perceive the AR model (setting image SIM in this case) and a specific object so that at least one of the position, size, and orientation of the AR model is aligned with at least one of the position, size, and orientation of the specific object. Meanwhile, RP on the right side in Expression (17) indicates a mapping parameter (or also referred to as a rendering parameter) which is determined in a case where a projection model similar to a pinhole camera model is used, and is expressed as the following Expression (18) in the present embodiment.

$$RP = \begin{bmatrix} \frac{2}{W}F_x & 0 & 1 - \frac{2C_x}{W} & 0 \\ 0 & \frac{2}{H}F_y & 1 - \frac{2C_y}{H} & 0 \\ 0 & 0 & -\frac{(n+f)}{f-n} & \frac{-2nf}{f-n} \\ 0 & 0 & -1 & 0 \end{bmatrix} \quad (18)$$

Here, Fx and Fy in Expression (18) indicate focal lengths converted into the number of pixels of a projector in the HMD 100, W indicates the number of pixels (resolution) of the left optical image display section 28 in a left-right direction, H indicates the number of pixels (resolution) of the left optical image display section 28 in an up-down direction, and Cx and Cy indicate the center position of a display image. Two upper rows of the mapping parameter contribute to the derivation of u and v. Here, f and n are coefficients for determining a correlation with normalized device coordinates having a normalized depth between 0 and 1. That is, these coefficients are coefficients for adjusting a depth in a rendering buffer (depth buffer), but does not directly contribute to the derivation of a position (u, v) of a display image.

Here, when it is assumed that an image of the specific object or the AR model X is imaged by the camera 60, Expression (19) is established between a point of the specific object or the AR model X and a corresponding point on the captured image.

$$\text{image}\begin{pmatrix} x \\ y \end{pmatrix} = \begin{pmatrix} f_x & 0 & C_x \\ 0 & f_y & C_y \\ 0 & 0 & 1 \end{pmatrix}(R, T) \cdot X \quad (19)$$

Here, (R, T) on the right side of Expression (19) indicates a transformation matrix indicating the position and pose of a specific object with respect to the camera 60, and is expressed by a camera coordinate system. The left side of the transformation matrix is a camera parameter CP. As schematically illustrated in Expression (19), (R, T) is estimated on the basis of a correlation between a point in a real space or a three-dimensional coordinate system and a point on a captured image, and thus it is preferable that the camera parameter CP is appropriate for the accurate estimation of the position and pose of a real object.

Since the same coordinate point of an AR model in three-dimension is rendered to a display buffer in the image processing section 160, the normalized device coordinates (NDC) thereof are expressed as Expression (20) using Expression (18).

$$\begin{pmatrix} u \\ v \\ w \\ z \end{pmatrix} = \begin{bmatrix} \frac{2}{W}F_x & 0 & 1 - \frac{2C_x}{W} & 0 \\ 0 & \frac{2}{H}F_y & 1 - \frac{2C_y}{H} & 0 \\ 0 & 0 & -\frac{(n+f)}{f-n} & \frac{-2nf}{f-n} \\ 0 & 0 & -1 & 0 \end{bmatrix} \quad (20)$$

$$(l, d)\begin{bmatrix} 1 & 0 & 0 & 0 \\ 0 & -1 & 0 & 0 \\ 0 & 0 & -1 & 0 \\ 0 & 0 & 0 & 1 \end{bmatrix}(R, T) \cdot X$$

Expression (20) is expressed by coordinate expression based on a homogenous coordinate system. Here, X on the right side of Expression (20) indicates internal coordinates of a model marker or an AR model, and is expressed by a coordinate system which is fixed to a model. In addition, (R, T) on the left side of X in Expression (20) indicates the position and pose of a specific object which is expressed by a camera coordinate system, and indicates the same position and pose as (R, T) in Expression (19). A 4×4 matrix having 0, 1, and −1 as elements on the left side of (R, T) in Expression (19) is a transformation matrix for transforming the orientation of a coordinate axis, and is provided for the sake of convenience in the present embodiment because the definition of a coordinate axis in a forward direction in a camera coordinate system is different from that in a display section coordinate system. In addition, (I, d) on the left side of the transformation matrix for transforming the orientation of a coordinate axis in Expression (19) indicates a spatial relationship between the camera 60 and the optical image display section 26 (28), and indicates a 4×4 transformation matrix constituted by rotation I and translation d that are expressed by a coordinate system of the optical image display section 26 (28). A coordinate point expressed by Expression (20) is a position expressed by (u', v') of Expression (21) in an image plane of the optical image display section 26 (28).

$$\begin{pmatrix} u' \\ v' \end{pmatrix} = \begin{bmatrix} -\frac{2}{W}F_x \cdot \frac{R_1 \cdot X + d_x + T_x}{-R_3 \cdot X + d_z - T_z} - \left(1 - \frac{2C_x}{W}\right) \\ -\frac{2}{W}F_y \cdot \frac{R_2 \cdot X + d_y + T_y}{-R_3 \cdot X + d_z - T_z} - \left(1 - \frac{2C_y}{H}\right) \end{bmatrix} \approx \qquad (21)$$

$$\begin{bmatrix} \frac{2}{W}\left(C_x + F_x \frac{T_x}{T_z}\right) - 1 \\ \frac{2}{H}\left(C_y + F_y \frac{-T_y}{T_z}\right) - 1 \end{bmatrix}$$

In the present embodiment, when calibration is successfully performed, the user US wearing the HMD 100 visually perceives a setting image SIM displayed on the optical image display sections 26 and 28 and a specific object (real marker MK1 in this example) so that the position, size, orientation, and depth perception of the setting image SIM are aligned with the position, size, orientation, and depth perception of the specific object.

Figure 13:
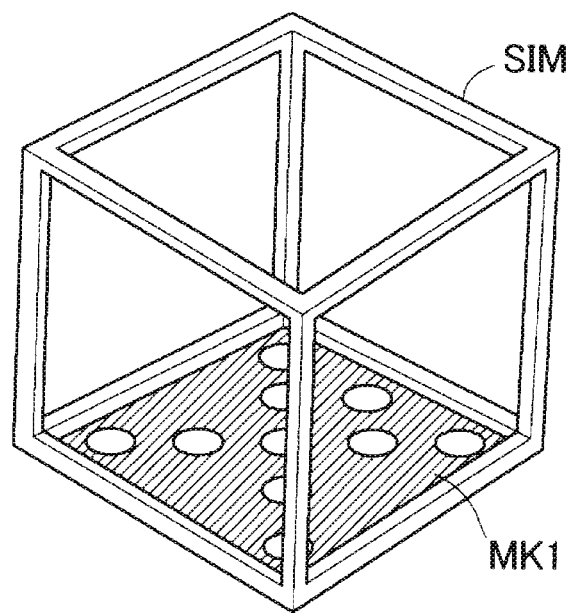
FIG. 13 is a diagram illustrating a setting image displayed in association with a specific object.

FIG. 13 is a diagram illustrating an example of a field of view of the user US who visually perceives a setting image SIM displayed in association with a specific object. In the example illustrated in FIG. 13, a real marker MK1 is adopted as the specific object. After calibration is executed, the display image setting section 165 displays the setting image SIM on the right and left optical image display sections 26 and 28 in accordance with the position and orientation (pose) of the imaged real marker MK1, using a transformation parameter and a camera parameter CP which are set by the parameter setting section 167. The setting image SIM is an image constituting sides of a regular hexahedron. As illustrated in FIG. 13, the bottom of the regular hexahedron of the setting image SIM is displayed so as to match the real marker MK1. The user US can recognize the accuracy of calibration by visually perceiving a spatial relationship between the real marker MK1 as a specific object and the setting image SIM. When the user US does not visually perceive the real marker MK1 and the setting image SIM so that the real marker and the setting image match each other, the user can execute calibration again in the first setting mode or the second setting mode. As illustrated in FIG. 13, the optical image display sections 26 and 28 or the sound processing section 170 may present a character image or a sound for promoting either the continuation of an AR display function by the success of calibration (or viewed in an overlapping manner) or the re-execution of calibration, to the user US.

A-2-2-4. Collecting of Calibration Data:

First, in a description of the calibration data collecting process, coordinate axes of coordinate systems fixed to the optical image display sections 26 and 28 will be described by taking a case of the right optical image display section 26 as an example. In this embodiment, the Z-axis of the coordinate system of the right optical image display section 26 matches a normal direction of a display region which is visually perceived by the user US in a case where the user US appropriately wears the HMD 100. For this reason, the Z-axis may indicate a direction in which the face of the user US faces. The X-axis is perpendicular to the Z-axis, and is substantially parallel to a direction in which the right optical image display section 26 and the left optical image display section 28 are lined up. For this reason, the X-axis may indicate the left-right direction of the user US. In addition, the Y-axis is perpendicular to both the Z-axis and the X-axis. For this reason, the Y-axis may indicate the up-down direction of the user US.

In this embodiment, in the above-described first setting mode, as described later together with FIGS. 14 to 16, the user US notifies the parameter setting section 167 that the alignment of the marker image IMG and the real markers MK1 and MK2 by visual observation has been established, through the operation of a touch pad, the pressing-down of a button, or the utterance of a sound command. The camera 60 captures images of the markers MK1 and MK2, that is, collects calibration data on the necessary condition that the parameter setting section 167 has received these operations or the sound command. That is, the HMD 100 uses the operation or utterance of the user US as a trigger for collecting calibration data. Hereinafter, prior to a description of this embodiment using FIGS. 14 to 16, a description will be given of a configuration in which calibration data is automatically collected, as another embodiment in which the operation or utterance of the user US is not used.

Figure 14:
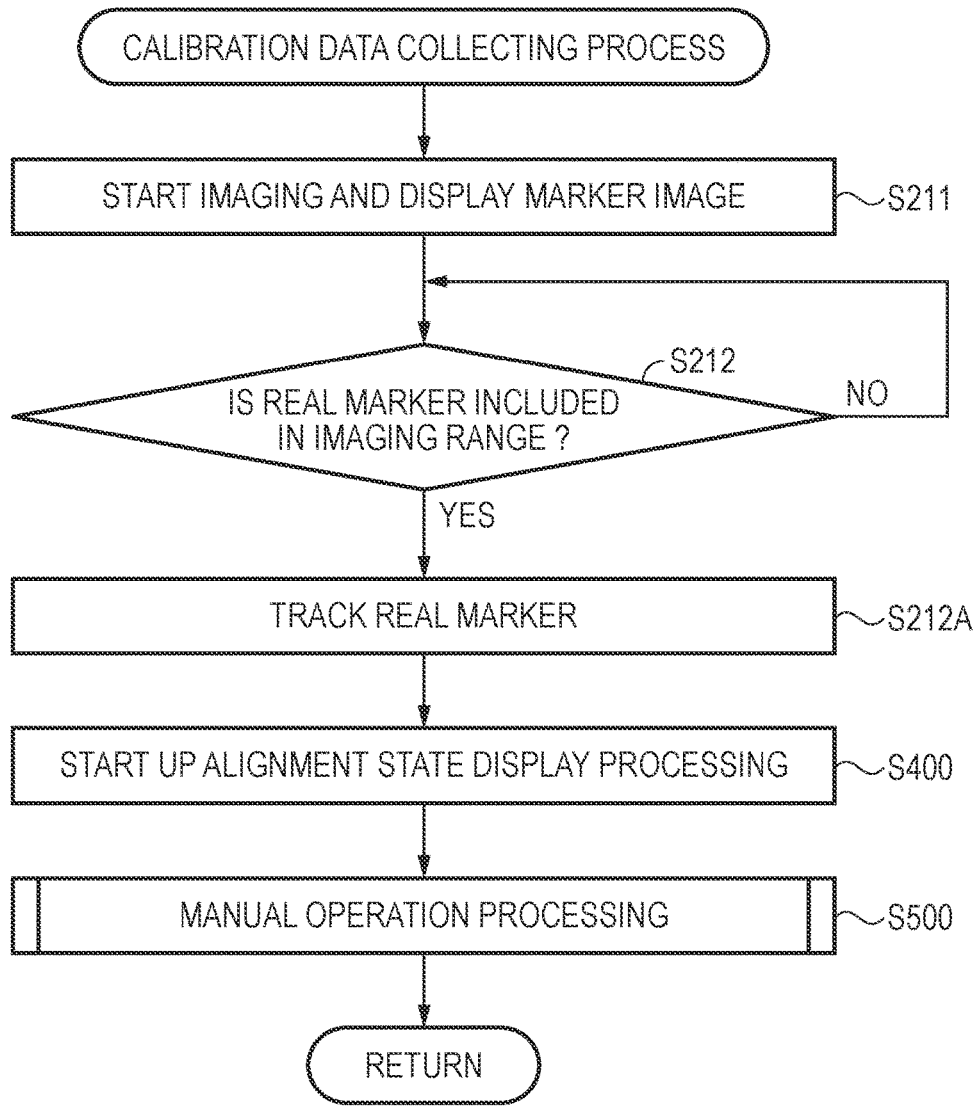
FIG. 14 illustrates a flow of a calibration data collecting process.

FIG. 14 illustrates a flow of a collecting process of calibration data according to an embodiment. In this process, first, the marker specification section 166 starts imaging, and one of the optical image display sections 26 and 28 (hereinafter, the right optical image display section 26) starts displaying a marker image IMG (S211). The marker specification section 166 executes binarization on each imaging frame imaged by the camera 60 to thereby extract a real marker MK2. The marker specification section 166 determines whether or not the real marker MK2 is included in an imaging range (S212). In a case where the marker specification section 166 determines that the real marker MK2 is not included in the imaging range (S212: NO), the marker specification section continuously monitors the detection of the real marker MK2 from the imaging range.

In the process of step S212, in a case where the marker specification section 166 determines that the real marker MK2 is included in the imaging range (S212: YES), the marker specification section derives the position and pose of the real marker MK2 with respect to the camera 60 and starts tracking the derived position and pose (S212A).

The derived position and pose of the real marker MK2 are expressed by a camera coordinate system. In other words, the position and pose are a position and a pose with respect to the camera 60. Consequently, the position and pose of the real marker MK2 with respect to the camera 60 are transformed into an approximate position and pose which are expressed by a coordinate system of the right optical image display section 26, that is, a temporal temporal position and pose, using a default spatial relationship between the camera 60 and the right optical image display section 26. The wording "default spatial relationship" refers to, for example, one spatial relationship which is present between both ends of a relative movable range between the camera 60 and the right optical image display section 26. A 4×4 transformation matrix T indicating a position and a pose, that is, rotation and translation is expressed as Expression (21A).

$$T(\text{marker to display}) = T(\text{camera to display}) * \text{Tracking pose} \qquad (21A)$$

Here, "T(marker to display)" on the left side indicates an approximate position and pose of the real marker MK2 with respect to the right optical image display section 26, and "T(camera to display)" on the right side indicates a default transformation matrix from a coordinate system of the camera 60 to a coordinate system of the right optical image display section 26, and "Tracking pose" indicates the position and pose of the real marker MK2 with respect to the camera 60.

Whether or not rotation differences around the X-axis and the Y-axis in the coordinate system of the optical image display section 26 between a model marker and the real marker MK2 are less than a predetermined value may be determined as in the following Expression (21B) and Expression (21C).

$$\mathrm{abs}(A_x - \text{approximated } A_x) < \text{threshold} \quad (21\mathrm{B})$$

$$\mathrm{abs}(A_y - \text{approximated } A_y) < \text{threshold} \quad (21\mathrm{C})$$

Here, "$A_x$" and "$A_y$" indicate rotation angles of a model marker around the X-axis and the Y-axis, respectively. In addition, "approximated $A_x$" and "approximated $A_y$" indicate approximate rotation angles of the real marker MK2 around the X-axis and the Y-axis, and are Euler's angles that are all expressed in units of degrees. The values of the two "thresholds" in the above-described expressions may be different from each other. In addition, "Abs" means the taking of an absolute value of a value. Meanwhile, as described above, the model marker refers to a model expressed in a three-dimensional coordinate space, and is to be mapped to 2D and displayed as a marker image IMG.

Next, in the coordinate system of the right optical image display section 26, whether or not approximate translations ($T_x'$, $T_y'$) along the X-axis and the Y-axis of the real marker MK2 are close to translations ($t_x$, $t_y$) of a model marker may be determined using the following relational expressions of Expression (21D) and Expression (21E).

$$\frac{\mathrm{Abs}(T_x' - t_x)}{t_x} < \text{threshold} \quad (21\mathrm{D})$$

$$\frac{\mathrm{Abs}(T_y' - t_y)}{t_y} < \text{threshold} \quad (21\mathrm{E})$$

The values of the two "thresholds" in Expression (21D) and Expression (21E) may be different from each other, and may be different from the values of "thresholds" in Expression (21B) and Expression (21C). In the following description, the above-mentioned difference in rotation angle will be collectively referred to as a "rotation difference A", and the above-mentioned difference in translation will be collectively referred to as a "translation difference D".

Returning back to the flow of FIG. 14, when the tracking of the real marker is started in S212A, alignment state display processing is started up in S400. In this embodiment, a thread performing the alignment state display processing of S400 is executed separately from a thread performing manual operation processing of S500 so that an alignment state is monitored and/or displayed through S400 over a period for which the manual operation processing of S500 is executed. Therefore, as a result, even when a change is made to the alignment state during the process of S500, a process based on the change in the alignment state can be executed in S500.

Figure 15:
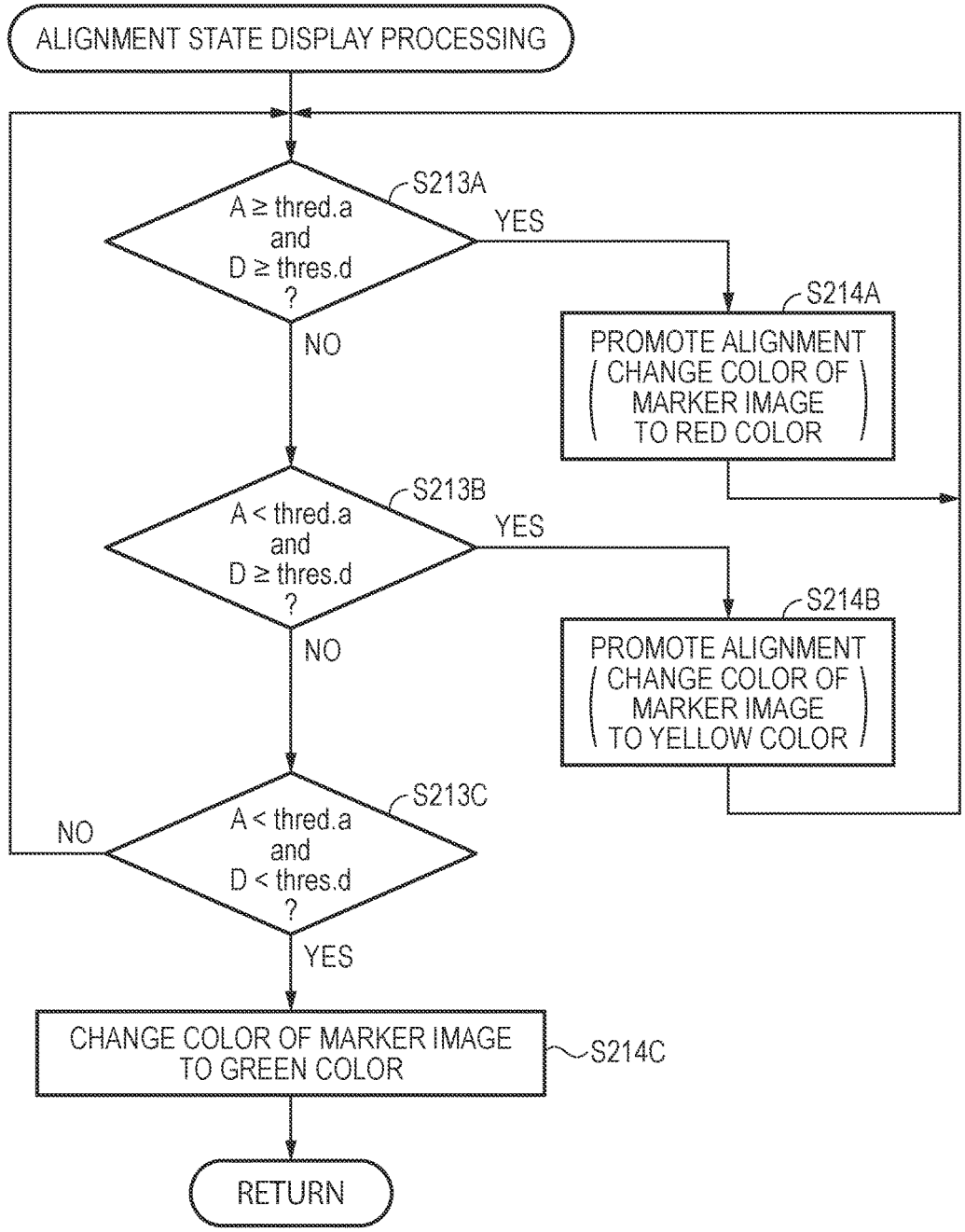
FIG. 15 illustrates a flow of alignment state processing.

FIG. 15 illustrates details of S400 in FIG. 14. When the alignment state display processing is started, the marker specification section 166 determines whether or not the rotation difference A is equal to or greater than the threshold (threshold) thereof and the translation difference D is equal to or greater than the threshold thereof (S213A). In a case where it is determined that both the rotation difference A and the translation difference D are equal to or greater than the respective thresholds (S213A: YES), the display image setting section 165 changes the color of a marker image to a red color, and displays a character image for promoting alignment on the right optical image display section 26 (S214A). In a case where the determination result in S213A is "negative" (S213A: NO), the marker specification section 166 determines whether or not the rotation difference A is less than the threshold and the translation difference D is equal to or greater than the threshold (S213B). In a case where it is determined that the rotation difference A is less than the threshold and the translation difference D is equal to or greater than the threshold (S213B: YES), the display image setting section 165 changes the color of a marker image to a yellow color and displays a character image for promoting alignment on the right optical image display section 26 (S214B). In a case where the determination result in S213B is "negative" (S213B: NO), the marker specification section 166 determines whether or not the rotation difference A is less than the threshold and the translation difference D is less than the threshold (S213C). In a case where it is determined that both the rotation difference A and the translation difference D are less than the respective thresholds (S213C: YES), the display image setting section 165 changes the color of the marker image to a green color (5214C). A state where both the rotation difference A and the translation difference D are less than the respective thresholds is referred to as a temporal alignment state. For this reason, the setting of the color of the marker image to a green color means that the establishment of the temporal alignment state is reported to the user US.

In a case where the determination result in S213C is "negative" (S213C: NO), the process to be subsequently performed returns to the determination in S213A.

The parameter setting section 167 can determine whether a head is in a stabilized state or a substantially static state, from the position of a feature point of the real marker MK2 in a captured image obtained by the camera 60, the output of an IMU built into the HMD 100, and a combination thereof.

Figure 16:
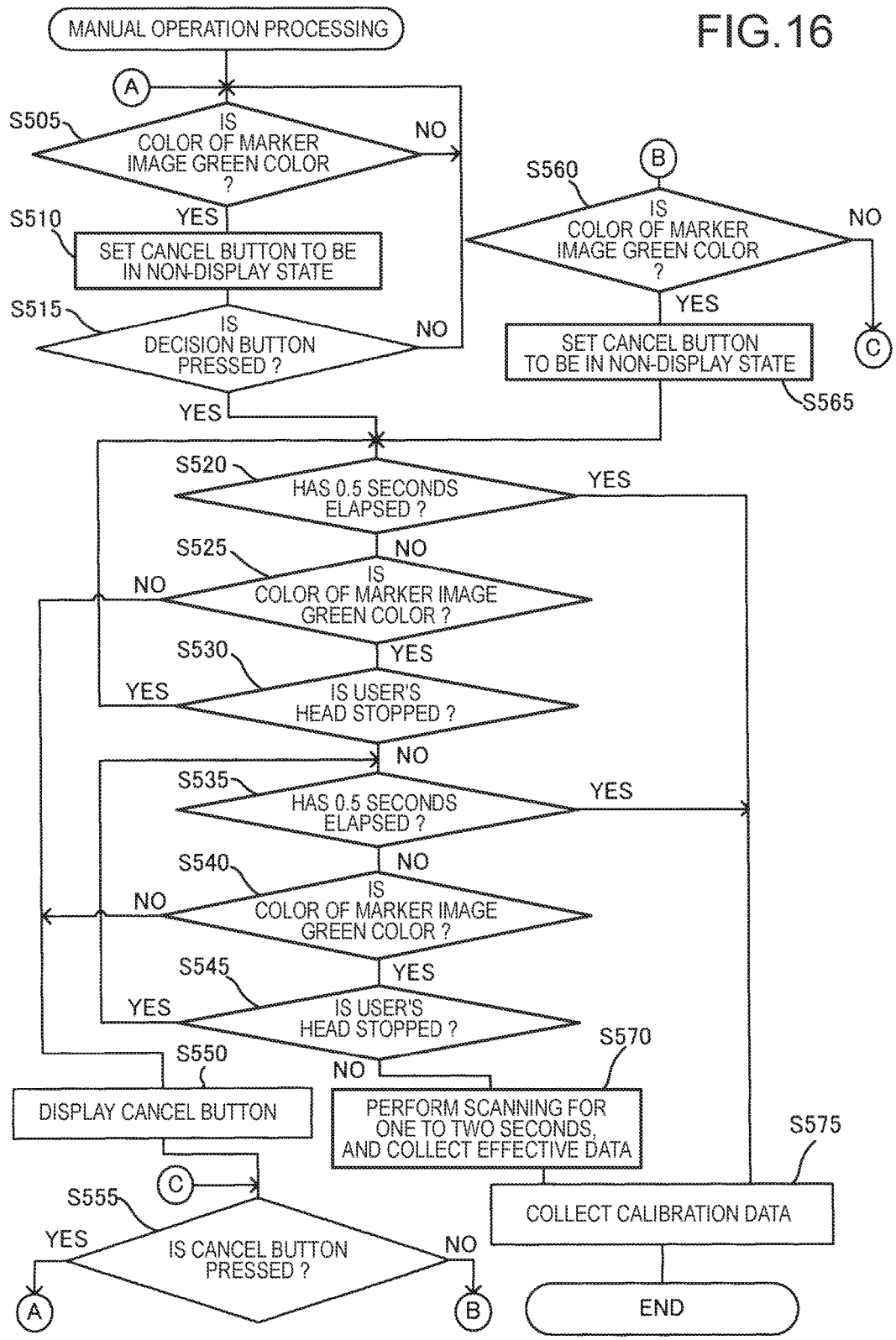
FIG. 16 illustrates a flow of manual operation processing.

FIG. 16 illustrates a flow of details of the manual operation processing in S500 of FIG. 14. The main body performing the steps of the manual operation processing is the parameter setting section 167.

First, it is determined whether or not the marker image is green on the basis of the latest determination in S400 (S505). In a case where the marker image is red or yellow (S505: NO), the determination in S505 is repeated.

In a case where the marker image is green (S505: YES), a cancel button is set to be in a non-display state (S510). Meanwhile, the cancel button is displayed through S550, and S510 is skipped in a case where the cancel button is not originally displayed.

Subsequently, it is determined whether or not a decision button has been pressed (S515). The decision button is a button included in the control section 10. The user US previously gives an instruction for pressing the decision button in a case where the marker image is green and alignment is seen as being accurate.

In a case where the decision button has not been pressed (S515: NO), the processing returns to S505. That is, even when the decision button is pressed in a case where the marker image is red or yellow, the determination result is not set to be YES in S515.

In a case where the decision button is pressed in a state where the marker image is green (S515: YES), it is determined whether or not 0.5 seconds has elapsed after the decision button is pressed (S520). When the process of S520 is performed at a first step, the elapsed time is still less than 0.5 seconds (S520: NO) in this embodiment, and thus it is subsequently determined whether or not the marker image is green (S525). In a case where the marker image is green (S525: YES), it is determined whether or not the head of the user US is substantially static (S530). In a case where the head of the user US is substantially static (S530: YES), the processing returns to S520.

In this manner, the processes of S520 to S530 are repeated, and in a case where a state where the marker image is green and the head of the user US is substantially static is maintained for 0.5 seconds or longer after the decision button is pressed (S520: YES), calibration data is collected (S575), and the manual operation processing is terminated. In addition, the alignment state display processing and the calibration data collecting process are also terminated. The collecting of calibration data is performed on the basis of imaging data in a period of time for which the marker image is green and the head of the user US is substantially static.

On the other hand, in a case where the marker image being green is maintained, but the head of the user US is moved (S530: NO), the same processes as S520 to S530 are repeated as S535 to S545. However, a point in time for calculating whether or not 0.5 seconds has elapsed is a point in time when the head of the user US starts being substantially static after the head of the user US is moved.

As a result of the execution of S535 to S545 as a second attempt, in a case where a state where the head of the user US is substantially static is maintained for 0.5 seconds or longer (S535: YES), the processing proceeds to S575.

On the other hand, in a case where the head of the user US is moved again (S545: NO), a captured image is acquired (scanning is performed) for one to two seconds, effective data is collected (S570), and the processing proceeds to S575. For this reason, even when the head of the user US cannot be substantially static, data is collected. At this time, insufficient data may be collected, and thus the accuracy of calibration may be sacrificed. However, the user US is caused to experience alignment to the end rather than forcibly terminating the alignment processing for the reason that the head has been moved, and thus the user US unaccustomed to alignment can become accustomed to a series of processes, which results in an increasing possibility that the user US establishes alignment in the future.

On the other hand, in a case where the color of the marker image is changed to red or yellow after the decision button is pressed (S525 or S540: NO), the cancel button is displayed on the image display section 20 (S550).

In a case where the cancel button is pressed (S555: YES), the processing returns to S505. That is, the manual operation processing is performed from the beginning. On the other hand, in a case where the cancel button has not been pressed (S555: NO), it is determined whether or not the marker image has become green (S560). In a case where the marker image has not become green (S560: NO), the processing returns to the determination of S555.

In a case where the marker image has become green before the cancel button is pressed (S560: YES), the cancel button is set to be in a non-display state (S565), and the processing proceeds to S520. In this case, a point in time for calculating whether or not 0.5 seconds has elapsed is a point in time when the head of the user US starts being substantially static after the determination result in S560 is YES.

In the present embodiment, it is determined whether or not a "rotation difference A" is less than a threshold on the basis of a difference between two rotation angles. However, it may be determined whether or not the "rotation difference A" is less than a threshold on the basis of a difference between rotation angles around one axis or a difference between rotation angles around three axes. The same is true of a "translation difference D".

In the calibration data collecting process described with reference to FIGS. 14, 15, and 16, the user US presses the decision button in a case where it is determined that alignment is made by the user's visual observation while being supported by the color of the marker image. The collecting of calibration data is performed on the basis of determination of whether or not the head is substantially static with the pressing-down of the decision button as a trigger, and thus it is possible to expect to obtain a parameter group with higher accuracy.

A-2-3. Second Setting Mode:

In a second setting mode, the parameter setting section 167 receives an operation of the user US with respect to results of the calibration executed in a first setting mode and corrects the results of the calibration. In other words, the parameter setting section 167 corrects the position, size, and depth perception of an AR image (AR model) which is displayed in association with a specific object, on the basis of the received operation.

Figure 17:
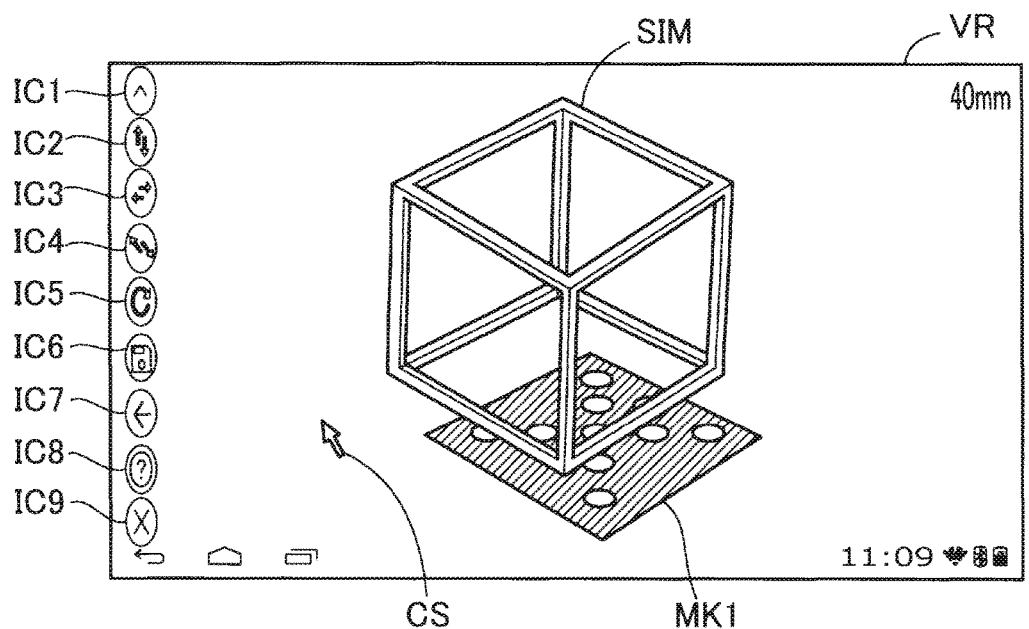
FIG. 17 is a diagram illustrating an example of a field of view which is visually perceived by a user in a case of transitioning to a second setting mode.

FIG. 17 is a diagram illustrating an example of a field of view VR which is visually perceived by the user US in a case of transitioning to a second setting mode. FIG. 17 illustrates a real marker MK1 as a specific object included in a scene which is passed through, a setting image SIM which is displayed on the optical image display sections 26 and 28 in association with the real marker MK1, and eight icons and a cursor image CS which are displayed on the optical image display sections 26 and 28 in a second setting mode. The eight icons are icons for changing a setting mode in the second setting mode by an operation received by the operation input section 135 of the control section 10. In the example illustrated in FIG. 17, the position of the real marker MK1 of the scene and the position of the bottom of a regular hexahedron which is the displayed setting image SIM do not overlap each other when seen from the user US. In other words, the accuracy of calibration is not sufficient. In this case, in the present embodiment, the user US can correct results of calibration performed on the real marker MK1 and the setting image SIM by operating the operation input section 135 in the second setting mode.

When a track pad of the operation input section 135 receives a predetermined operation, the parameter setting section 167 moves the position of the cursor image CS displayed on the optical image display sections 26 and 28. When a decision button of the operation input section 135 is pressed down in a state where the cursor image CS overlaps any of the eight icons, the parameter setting section 167 transitions to a setting mode which is associated with the icon overlapping the cursor image CS.

An icon IC1 is an icon for transitioning to a mode for enlarging or reducing the setting image SIM when being selected. In a mode of the icon IC1, the operation input section 135 receives a predetermined operation, and thus the parameter setting section 167 changes the size of the setting image SIM displayed on the optical image display sections 26 and 28 by correcting either one or both of the above-mentioned camera parameter CP and transformation parameter. In the present embodiment, the parameter setting section 167 adjusts the size of the setting image SIM by correcting either one or both of focal lengths $F_x$ and $F_y$ in the camera parameter CP and focal lengths $F_x$ and $F_y$ in the mapping parameter. A user US can change the size of the setting image SIM so as to be aligned with the size of the real marker MK1 by selecting the icon IC1.

An icon IC2 is an icon for transitioning to a mode for vertically moving the display position of the setting image SIM when being selected. In a mode of the icon IC2, the operation input section 135 receives a predetermined operation, and thus the parameter setting section 167 corrects transformation parameters of the respective optical image display sections 26 and 28, so that the optical image display sections 26 and 28 vertically move the setting image SIM in a displayable range. In the present embodiment, the parameter setting section adjusts a parameter Rx indicating rotation around the X-axis among the transformation parameters to thereby vertically (that is, in the Y-axis direction) move the setting image SIM. Meanwhile, in the display of the transformation parameter, X and Y indicate the X-axis and the Y-axis of a coordinate system fixed to the optical image display sections 26 and 28. Furthermore, as described above, the X-axis may indicate the left-right direction of the user US wearing the HMD 100, and the Y-axis may indicate the up-down direction.

An icon IC3 is an icon for transitioning to a mode for horizontally moving the display position of the setting image SIM when being selected. In a mode of the icon IC3, the operation input section 135 receives a predetermined operation, and thus the parameter setting section 167 corrects transformation parameters of the respective optical image display sections 26 and 28, and the optical image display sections 26 and 28 horizontally move the setting image SIM in a displayable range. In the present embodiment, the parameter setting section 167 adjusts a parameter $R_y$ indicating rotation around the Y-axis among the transformation parameters to thereby horizontally (that is, the X-axis direction) move the setting image SIM. A user US can change the display position of the setting image SIM so as to align the position of the setting image SIM with the real marker MK1 by selecting the icon IC2 and the icon IC3.

An icon IC4 is an icon for adjusting the depth perception of the setting image SIM which is visually perceived by the user US when being selected. In a mode of the icon IC4, the operation input section 135 receives a predetermined operation, and thus the parameter setting section 167 adjusts Cx which is an X component of a display principal point in mapping parameters of the respective optical image display sections 26 and 28 to thereby change the depth perception of the setting image SIM. When the amount of adjustment of the depth perception is set to be ACx, the display principal point of the right optical image display section 26 is set to be Cx_right, and the display principal point of the left optical image display section 28 is set to be Cy left, the display principal points after the adjustment of the depth perception are expressed as the following Expression (21F) and Expression (21G), respectively.

$$Cx\_left = Cx\_left + \Delta Cx \quad (21F)$$

$$Cx\_right = Cx\_right - \Delta Cx \quad (21G)$$

In the expression of the mapping parameter, X indicates the X-axis of a coordinate system fixed to the optical image display sections 26 and 28. As described above, the X-axis in this case may indicate the left-right direction of the user US wearing the HMD 100. According to Expression (21F) and Expression (21G), center positions of right and left image regions displayed on the right and left optical image display sections 26 and 28 vary by the same amount in the opposite directions, and thus the right and left image regions come close to or recede from each other. As a result, when the user US observes the right and left image regions with both eyes, the user can visually perceive an AR image (AR object) at an appropriate convergence angle depending on a distance of a specific object. For this reason, depth perceptions of the specific object and the AR image are aligned with each other therebetween.

An icon IC5 is an icon for returning the correction of a parameter group having been executed so far to the value of the parameter group before the execution, when being selected. An icon IC6 is an icon for updating the correction of a parameter group having been executed so far as a new parameter group (a camera parameter CP, a transformation parameter, and a mapping parameter) and storing the new parameter group, when being selected.

An icon IC7 is an icon for returning to the last mode which precedes the second setting mode, when being selected. In other words, when the icon IC7 is selected, the display image setting section 165 displays a selection screen regarding to which setting mode of the second setting mode and the first setting mode illustrated in SS13 of FIG. 9 is transformed, on the optical image display sections 26 and 28.

An icon IC8 is an icon for causing the display image setting section 165 to display "help" which is an explanation on the optical image display sections 26 and 28, when being selected. When "help" is displayed, an explanation regarding an operation for executing calibration in a second setting mode and a calibration execution process is displayed on the optical image display sections 26 and 28. An icon IC9 is an icon for terminating a calibration execution process including a second setting mode, when being selected.

Figure 18:
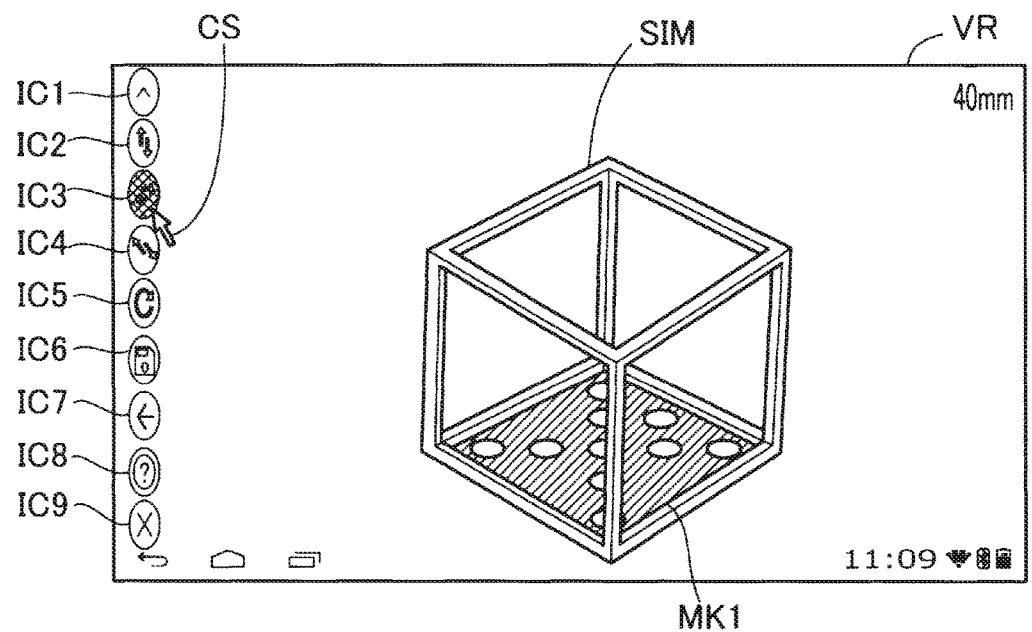
FIG. 18 is a diagram illustrating a case where a display position of a setting image is changed in a second setting mode.

FIG. 18 is a diagram illustrating an example of a field of view VR which is visually perceived by the user US when the display position of a setting image SIM is changed in a second setting mode. In this example, the orientation, size, and depth perception of the setting image SIM already match those of a real marker MK1, and the superposition accuracy of an AR image is improved by adjusting only display positions in horizontal and up-down directions. FIG. 18 illustrates a state where the display position of the setting image SIM is set so that the position of the bottom of a regular hexahedron which is the setting image SIM is aligned with the position of the real marker MK1, by a predetermined operation being received by the operation input section 135 after an icon IC2 and an icon IC3 are selected in the second setting mode. As a specific operation, first, the display position of the setting image SIM in the up-down direction is aligned with the real marker MK1 by the icon IC2 being selected, and the display position of the setting image SIM in the left-right direction is aligned with the real marker MK1 by the icon IC3 being selected. Thereafter, when an icon IC5 is selected, a transformation parameter is updated and stored.

As described above, in the HMD 100 according to the first embodiment, the camera 60 images a scene including a specific object. The parameter setting section 167 acquires a captured image of a specific object from the camera 60 in a state where the user US is caused to visually perceive the position and pose of a model marker displayed as the marker image IMG on the optical image display section 26 (28) which substantially match the position and pose of the real marker MK1 (MK2). The parameter setting section 167 sets a parameter group on the basis of at least the acquired captured image. The parameter group includes a camera parameter CP of the camera 60, transformation parameters from 3D to 3D which respectively indicate a spatial relationship between the camera 60 and the right optical image display section 26 and a spatial relationship between the camera 60 and the left optical image display section 28, and mapping parameters from 3D to 2D for displaying any 3D model as an image on the optical image display sections 26 and 28. The HMD 100 estimates the position and pose of a specific object by using the camera parameter CP. In addition, the HMD 100 displays an AR image on each of the optical image display sections 26 and 28 so that the user US is caused to visually perceive an AR model associated with the specific object as the AR image in a state where the position and pose of the AR model correspond to, and preferably, substantially match the position and pose of the specific object, by using the transformation parameters and the mapping parameters. Therefore, it is possible to provide the HMD 100 capable of causing the user US to visually perceive the specific object and the AR model (AR image) associated with the specific object so as to correspond to, and preferably, substantially match each other through the calibration in the first setting mode.

In addition, in the HMD 100 according to the first embodiment, the parameter setting section 167 sets at least one parameter of the camera parameter CP, the transformation parameters, and the mapping parameters so that the user US is caused to visually perceive the setting image SIM in a state where the position, size, and depth perception of the setting image SIM displayed on the optical image display sections 26 and 28 correspond to, and preferably, match the position, size, and depth perception of the real marker MK1 (MK2), in accordance with an operation received by the operation input section 135 in the second setting mode. For this reason, in the HMD 100 according to the first embodiment, the operation input section 135 receives a predetermined operation, so that the user US can further manually correct a positional relationship between the specific object and the AR model (AR image). Thereby, the user US can easily perform calibration and can perform calibration with higher accuracy.

In addition, in the HMD 100 according to the first embodiment, the parameter setting section 167 sets a parameter regarding at least one of the camera parameter CP and the transformation parameters by using an image captured by the camera 60 in the first setting mode. In addition, the parameter setting section 167 sets a parameter regarding at least one of the camera parameter CP, the transformation parameters, and the mapping parameters in accordance with a predetermined operation received by the operation input section 135 in the second setting mode. For this reason, in the HMD 100 according to the first embodiment, it is possible to individually set the camera parameter CP and the transformation parameters, which are set in the first setting mode, in the second setting mode. Thereby, it is possible to individually adjust parameters which cannot be adjusted in the first setting mode. As a result, it is possible to increase accuracy when an AR image associated with a specific object is displayed so as to be superimposed on the specific object.

In addition, in the HMD 100 according to the first embodiment, the camera 60 is disposed so as to be capable of changing its orientation with respect to the mounting band 90. The optical image display sections 26 and 28 capable of displaying the setting image SIM are disposed so as to be capable of changing the relative positions thereof to the mounting band 90. For this reason, the camera 60 is disposed so that the position and orientation thereof can be changed with respect to the optical image display sections 26 and 28 (the HMD 100 is also referred to as a "camera movable HMD"), and calibration is required to be set in accordance with a change in a positional relationship between the camera 60 and each of the optical image display sections 26 and 28. in the HMD 100 according to the first embodiment, the user US can easily perform calibration required in accordance with the change in the positional relationship by executing the first setting mode and the second setting mode. Naturally, in an HMD in which a spatial relationship between the camera and each of the optical image display sections 26 and 28 is fixed (also referred to as a "camera fixed HMD"), rotation and translation which indicate a spatial relationship between the camera and the optical image display section may be set to be variable as a calibration parameter in every calibration (first setting mode) which is performed by the user US, and the optimization of the spatial relationship may be performed. Such calibration is useful when the dispersion of the spatial relationship throughout individuals is large due to a manufacturing error also in the camera fixed HMD.

In addition, in the HMD 100 according to the first embodiment, the display image setting section 165 displays the setting image SIM in association with the real marker MK2 or the real marker MK1 which is the imaged specific object, on the basis of the camera parameter CP and the transformation parameters which are set by the parameter setting section 167. For this reason, in the HMD according to the first embodiment, the user US can visually perceive a result of calibration performed and can determine whether or not additional adjustment is required to be performed, and thus the convenience of the user US is improved.

In addition, in the HMD 100 according to the first embodiment, the display image setting section 165 displays an image, obtained by changing the color of the marker image IMG associated with the real marker MK2 as a specific object, on the right optical image display section 26 as information indicating countdown until the imaging of the camera 60. For this reason, in the HMD 100 according to the first embodiment, the user US can be caused to recognize a timing when the camera 60 images the real marker MK2 as visual information, and the user US can intuitively perform alignment for calibration.

B. Second Embodiment

A second embodiment is different from the first embodiment in terms of a real marker imaged by the camera 60 during calibration and a portion of a first setting mode in which the real marker is imaged. For this reason, in the second embodiment, processes different from those in the first embodiment will be described, and the same processes as those in the first embodiment will not be described.

Figure 19:
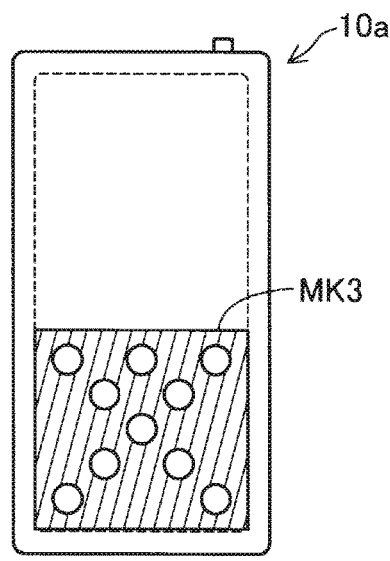
FIG. 19 is a front view illustrating the rear face of a control section in a second embodiment.

FIG. 19 is a front view illustrating the rear face of a control section 10a in the second embodiment. FIG. 19 illustrates a rear face in a case where a face having an operation input section 135 in the control section 10a formed thereon is defined as a surface. As illustrated in FIG. 19, a real marker MK3 obtained by reducing a real marker MK1 is disposed on the rear face of the control section 10a.

In a first setting mode according to the second embodiment, a display image setting section 165 first displays a marker image IMG on a right optical image display section 26, similar to the first setting mode according to the first embodiment (S201 in FIG. 10). A parameter setting section 167 prompts a user US to align the marker image IMG and the real marker MK3 which is positioned on the rear face of the control section 10a (S210). When alignment of the real marker MK3 and the marker image IMG is performed, the display image setting section 165 displays the marker image IMG, which has a size different from the size of the marker image IMG displayed on the right optical image display section 26 in S201, on the right optical image display section 26, unlike the first embodiment (S202). The parameter setting section 167 prompts the user US to align the marker image IMG, which has a size different from the size during the process of S201, and the real marker MK3 (S220). Here, two marker images IMG having different sizes are generated by two-dimensionally mapping the same model markers having different virtual positions (distances along the Z-axis) with respect to the optical image display sections 26 and 28 in accordance with a mapping parameter in this embodiment. In the process of S220 in the second embodiment, even when the number of real markers to be used is one, there is an attempt to establish alignment with respect to the two marker images IMG having different sizes, and thus the user US aligns the right optical image display section 26 having the marker image IMG displayed thereon and the real marker MK3 while changing a distance, similar to the first embodiment. The process of S203 and the subsequent processes in the first setting mode are the same as processes performed on the right optical image display section 26, and thus a description thereof will be omitted.

In an HMD 100a according to the second embodiment, even when the number of real markers MK3 is one, it is possible to perform calibration with high accuracy by changing the marker image IMG displayed on the right optical image display section 26 or the left optical image display section 28 in the first setting mode.

C. Third Embodiment

A third embodiment is different from the first embodiment in terms of the shape of a real marker imaged by a camera 60 and the shape of a marker image IMG corresponding to the real marker when calibration is performed. For this reason, in the third embodiment, a description will be given of the shape of a real marker and the specification of the real marker which are different from those in the first embodiment, and the other configurations will not be described.

Figure 20:
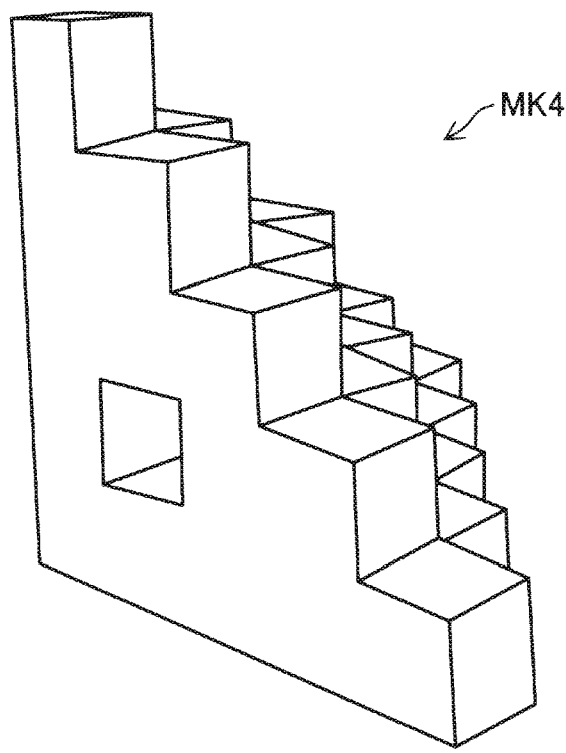
FIG. 20 is a schematic diagram illustrating an example of a real marker according to a third embodiment.
Figure 21:
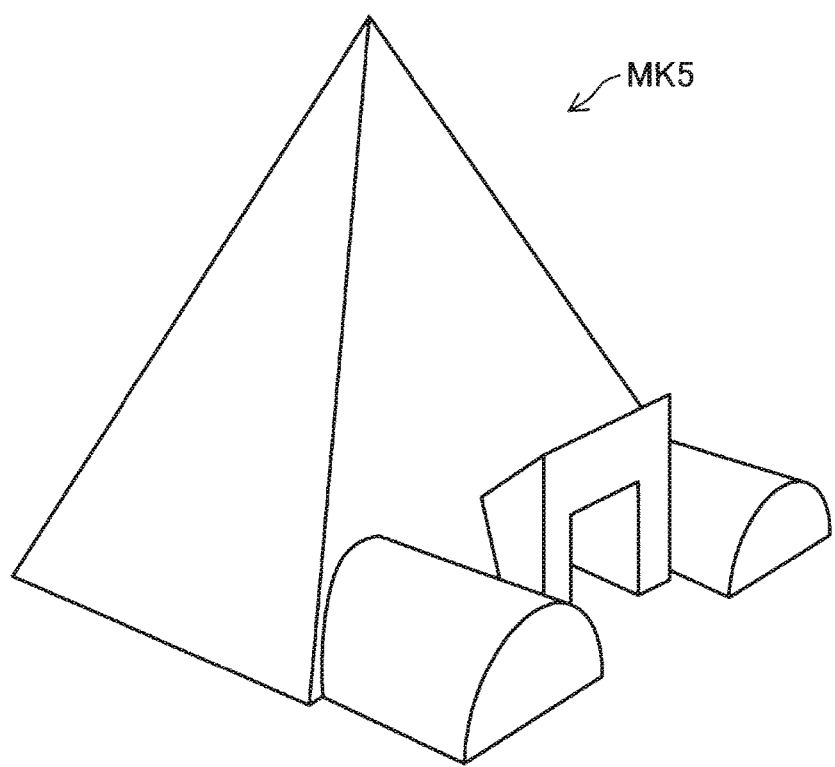
FIG. 21 is a schematic diagram illustrating an example of a real marker according to the third embodiment.

FIGS. 20 and 21 are schematic diagrams illustrating an example of a real marker according to the third embodiment. FIG. 20 illustrates a three-dimensional block formed stepwise as a real marker MK4. Similarly, FIG. 21 illustrates a three-dimensional block to which a block such as a semi-cylindrical portion is added with a triangular pyramid as a reference, as a real marker MK5. A marker image storage section 138b according to the third embodiment stores data of three-dimensional models corresponding to the real marker MK4 and the real marker MK5 together with the feature points thereof. For this reason, a marker specification section 166 estimates a correlation between the feature point stored in the marker image storage section 138b and a feature point in a captured image, and thus it is possible to estimate the position and pose of the real marker MK4 or the real marker MK5 with respect to the camera 60. A method of specifying a feature point may be edge detection using a distance to a specific position which is specified by a stereo camera, and a known technique can be applied.

The storage section stores a 3D model marker having a similar shape to the shape of the real marker MK4 or the real marker MK5. Meanwhile, similarly to the first embodiment, the model marker is defined within a virtual three-dimensional space. An HMD 100b maps the model marker, which is set to have a predetermined position and pose with respect to optical image display sections 26 and 28, in accordance with the above-described mapping parameters, and displays the model marker on the optical image display sections 26 and 28 as a marker image IMG. Hereinafter, similarly to the first embodiment, a user US is caused to establish alignment of the marker image IMG and the real markers MK4 and MK5.

As described above, in the HMD 100b according to the third embodiment, calibration is performed using a three-dimensional model having a larger number of feature points than in a two-dimensional model, and thus it is possible to perform calibration with high accuracy.

This disclosure is not limited to the embodiments, the examples, or the modifications of this specification and can be implemented in various configurations without departing from the spirit of the invention. For example, technical features of the embodiments, the examples, and the modifications corresponding to technical features in the forms described in the summary of the invention can be replaced or combined as appropriate in order to solve a part or all of the problems explained above or attain a part or all of the effects explained above. Unless the technical features are not explained in this specification as essential technical features, the technical features can be deleted as appropriate. For example, technical features described below are examples of such technical features.

D-1. Modification Example 1

In the first to third embodiments, a description has been given of the HMD 100 in which the position and orientation of the camera 60 with respect to the optical image display sections 26 and 28 are changed, as illustrated in FIGS. 1 to 3. Similarly, regarding an HMD 101 in which the position of the camera 60 with respect to the optical image display sections 26 and 28 is not changed, calibration described in the first to third embodiments is also effective. Meanwhile, hereinafter, the HMD 100 described in the first to third embodiments is also referred to as a "camera movable HMD", and the HMD 101 in which the position of the camera 60 is fixed is also referred to as a "camera fixed HMD". For example, even in a case of the camera fixed HMD, when dispersion of errors present in the rotation and translation indicating a spatial relationship between the camera 60 and each of the optical image display sections 26 and 28 is large between HMDs having the same specifications, calibration processing may be performed so as to adjust a relative relationship including the rotation and translation every time before the user US displays an AR image.

D-2. Modification Example 2

Factory Calibration (Initial Calibration) of Optical Image Display Sections 26 and 28 and a Camera 60:

For example, in a service station, a camera parameter CP of the camera 60, a spatial relationship (transformation parameter) between the camera 60 and the optical image display sections 26 and 28, and initial values (default values) of mapping parameters of the optical image display sections 26 and 28 may be derived by a process having the following steps.

1. Calibration of a high-resolution measuring camera is separately performed.

2. Calibration of the camera 60 included in the HMD 100 is separately performed to thereby derive a camera parameter CP.

3. The HMD 100 and the measuring camera are set up on a special jig. A planar pattern is installed as a world coordinate system.

4. Several positions are defined on the jig with respect to the measuring camera. In addition, the position and pose of the measuring camera with respect to the planar pattern are estimated at each of the positions.

5. An imaginary pattern having an imaginary position and pose with respect to the optical image display section 26 is mapped to the optical image display section 26. Meanwhile, the imaginary position and pose with respect to the optical image display section 26 are the same as the position and pose of a planar pattern with respect to the optical image display section 26.

6. The measuring camera is moved to the defined plurality of positions, and an image of the imaginary pattern displayed on the optical image display section 26 is captured at each of the positions.

7. A 3D position which is mapped using the captured images is reconstructed.

8. An internal parameter (mapping parameter) of the optical image display section 26 is estimated using a correlation between 2D and 3D.

9. The poses of two cameras (the camera 60 and the measuring camera) with respect to the planar pattern are calculated, and a transformation parameter between the camera 60 and the optical image display section 26 is solved.

10. The steps of 4 to 9 are repeated with respect to the optical image display section 28.

In the above-described embodiment, some or all of the functions and processes which are realized by software may be realized by hardware. In addition, some or all of the functions and processes which are realized by hardware may be realized by software. As the hardware, various circuits such as an integrated circuit, a discrete circuit, and a circuit module which is a combination of the circuits may be used.

The entire disclosure of Japanese Patent Application No. 2016-218971, filed in Nov. 9, 2016, is expressly incorporated by reference herein.

What is claimed is:

1. A method for a head-mounted display device comprising a camera and an optical see through display, comprising:
    displaying, with the optical see through display, a marker image that is capable of being perceived by a user to be at least partially aligned with a real marker;
    detecting the real marker from an image captured with the camera;
    setting at least one parameter for allowing an AR object displayed with the optical see through display to be perceived to correspond to an object in the scene;
    receiving an instruction from the user that the marker image is perceived by the user as aligned with the real marker;
    determining whether a user's head is kept in a substantially static condition for a predetermined period after receiving the instruction from the user, and
    collecting, from the image or another image captured with the camera, calibration data that is to be used in setting at least the parameter when the predetermined period elapses while the user's head is determined to be kept in the substantially static condition.

2. The method according to claim 1,
    wherein detecting the real marker includes deriving a temporal position and pose of the real marker based at least on the image, and collecting the calibration data includes accepting the instruction in the case where a difference between the temporal position and pose and a predetermined position and pose is below a threshold.

3. The method according to claim 2,
    wherein displaying the marker image includes displaying a specific image with the optical see through display in the case where the difference is below the threshold.

4. The method according to claim 3,
    wherein determining whether a user's head is in a substantially static condition is determining whether the user's head is in the substantially stable condition in the case where the user's head is determined to be out of the substantially stable condition after the instruction is accepted, and collecting the calibration data includes a collecting the calibration data in the case where the user's head is determined to be in the substantially static condition.

5. The method according to claim 4,
    wherein collecting the calibration data is collecting the calibration data, from at least one image captured with the camera, corresponding to a predetermined period of time subsequent to a time point when the user's head is determined to be out of the substantially static condition.

6. The method according to claim 2,
    wherein collecting the calibration data is collecting the calibration data from an image captured with the camera in the case where the user's head is first determined to be out of the substantially static condition then to be in the substantially static condition after the instruction is accepted.

7. The method according to claim 2,
    wherein collecting the calibration data includes accepting a predetermined instruction in the case where the user's head is determined to be out of the substantially stable condition after the instruction is accepted, and
    collecting the calibration data further includes accepting another instruction for collecting the calibration data in the case where the user's head is determined to be in the substantially static condition after the predetermined instruction is accepted.

8. A head-mounted display device comprising a camera and an optical see through display, and one or more processors configured to perform a method including:
    displaying, with the optical see through display, a marker image that is capable of being perceived by a user to be at least partially aligned with a real marker;
    detecting the real marker from an image captured with the camera;
    setting at least one parameter for allowing an AR object displayed with the optical see through display to be perceived to correspond to an object in the scene;
    receiving an instruction from the user that the marker image is perceived by the user as aligned with the real marker;
    determining whether a user's head is kept in a substantially static condition for a predetermined period after receiving the instruction from the user, and
    collecting, from the image or another image captured with the camera, calibration data that is to be used in setting at least the parameter when the predetermined period elapses while the user's head is determined to be kept in the substantially static condition.

9. A non-transitory computer readable medium that embodies instructions that cause one or more processors to perform a method comprising:
    displaying, with an optical see through display, a marker image that is capable of being perceived by a user to be at least partially aligned with a real marker;
    detecting the real marker from an image captured with a camera;

setting at least one parameter for allowing an AR object displayed with the optical see through display to be perceived to correspond to an object in the scene;

receiving an instruction from the user that the marker image is perceived by the user as aligned with the real marker;

determining whether a user's head is kept in a substantially static condition for a predetermined period after receiving the instruction from the user, and collecting, from the image or another image captured with the camera, calibration data that is to be used in setting at least the parameter when the predetermined period elapses while the user's head is determined to be kept in the substantially static condition.

* * * * *